(12) United States Patent
Knopf et al.

(10) Patent No.: US 11,647,692 B2
(45) Date of Patent: May 16, 2023

(54) GRIPPER WITH TUNABLE COMPLIANCE FOR DEXTEROUS OBJECT MANIPULATION

(71) Applicant: APPHARVEST TECHNOLOGY, INC., Morehead, KY (US)

(72) Inventors: Ryan R. Knopf, Melrose, MA (US); Joshua Aaron Lessing, Cambridge, MA (US); Jason A. Chrisos, Somerville, MA (US)

(73) Assignee: APPHARVEST TECHNOLOGY, INC., Morehead, KY (US)

( * ) Notice: Subject to any disclaimer, the term of this patent is extended or adjusted under 35 U.S.C. 154(b) by 873 days.

(21) Appl. No.: 16/453,415

(22) Filed: Jun. 26, 2019

(65) Prior Publication Data

US 2019/0387678 A1 Dec. 26, 2019

Related U.S. Application Data

(60) Provisional application No. 62/690,080, filed on Jun. 26, 2018.

(51) Int. Cl.
| | |
|---|---|
| *A01D 46/30* | (2006.01) |
| *A01D 46/253* | (2006.01) |
| *B25J 11/00* | (2006.01) |
| *B25J 15/00* | (2006.01) |

(Continued)

(52) U.S. Cl.
CPC ........... *A01D 46/30* (2013.01); *A01D 46/253* (2013.01); *B25J 11/0045* (2013.01); *B25J 13/082* (2013.01); *B25J 13/085* (2013.01); *B25J 13/088* (2013.01); *B25J 15/0014* (2013.01); *B25J 15/0033* (2013.01); *A01D 46/28* (2013.01)

(58) Field of Classification Search
CPC ...... A01D 46/24; A01D 46/253; A01D 46/28; A01D 46/30; B25J 15/0014; B25J 15/0033; B25J 15/0226; B25J 15/12; B25J 11/0045; B25J 13/082; B25J 13/085
USPC .............. 56/327.1, 328.1, 332, 333; 294/100
See application file for complete search history.

(56) References Cited

U.S. PATENT DOCUMENTS

| | | | |
|---|---|---|---|
| 3,387,444 A | 6/1968 | Krdzic | |
| 4,034,542 A * | 7/1977 | Loehr | A01D 46/247 294/111 |

(Continued)

FOREIGN PATENT DOCUMENTS

| | | |
|---|---|---|
| CN | 106342484 A | 1/2017 |
| DE | 3011837 A1 | 10/1981 |

(Continued)

OTHER PUBLICATIONS

Root AI, "Root AI—Introducing Virgo" (May 13, 2019); Retrieved: https://www.youtube.com/watch?v=XIXSGqvP-A8.

(Continued)

*Primary Examiner* — Dean J Kramer

(74) *Attorney, Agent, or Firm* — Benesch, Friedlander, Coplan & Aronoff LLP

(57) ABSTRACT

Harvesting tools are disclosed which may comprise a gripper including a set of finger elements constructed and arranged to envelop a target object pertaining to agricultural produce, and a manipulator carriage configured to actuate the gripper during operation to grasp the target object. Related systems and methods are also disclosed.

75 Claims, 24 Drawing Sheets

(51) Int. Cl.
*B25J 13/08* (2006.01)
*A01D 46/28* (2006.01)

(56) References Cited

U.S. PATENT DOCUMENTS

| | | | |
|---|---|---|---|
| 5,426,927 A * | 6/1995 | Wang | A01D 46/24 56/328.1 |
| 5,544,474 A * | 8/1996 | Finkelstein | A01D 46/30 56/10.2 A |
| 5,895,084 A | 4/1999 | Mauro | |
| 6,116,118 A | 9/2000 | Wesch, Jr. | |
| 9,132,555 B2 * | 9/2015 | Nakayama | B25J 15/12 |
| 10,464,217 B1 | 11/2019 | Phan et al. | |
| 10,827,882 B2 * | 11/2020 | Verhelle | A23G 3/24 |
| 2005/0230444 A1 | 10/2005 | Alling et al. | |
| 2014/0175817 A1 | 6/2014 | Murakami et al. | |
| 2015/0257839 A1 | 9/2015 | Vause et al. | |
| 2015/0314893 A1 | 11/2015 | Rembala et al. | |
| 2016/0073584 A1 | 3/2016 | Davidson et al. | |
| 2016/0375590 A1 | 12/2016 | Lessing et al. | |
| 2018/0049371 A1 | 2/2018 | Pitzer | |
| 2019/0387678 A1 | 12/2019 | Knopf et al. | |
| 2020/0323140 A1 * | 10/2020 | Gielis | A01D 46/24 |

FOREIGN PATENT DOCUMENTS

| | | | |
|---|---|---|---|
| GB | 2202724 | * | 10/1988 |
| KR | 101717884 | * | 3/2017 |
| WO | 2018015416 A1 | | 1/2018 |

OTHER PUBLICATIONS

Privvall, "Meet the Kompano!" (Jun. 14, 2016); Retrieved: <https://www.youtube.com/watch?v=mZpL264-rm8>.

Wur Glastuinbouw, "Cucumber Harvesting Robot" (Jan. 29, 2013); Retrieved: <<https://www.youtube.com/watch?v=EiQG4zhMHLM>>.

* cited by examiner

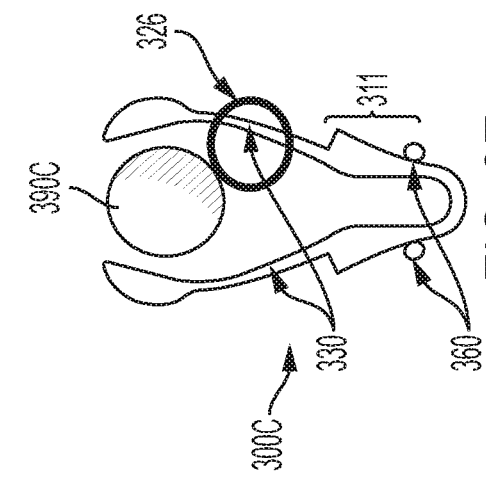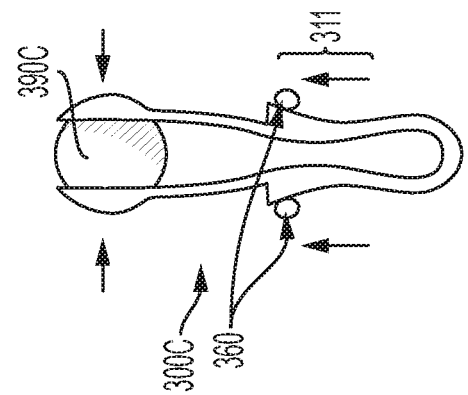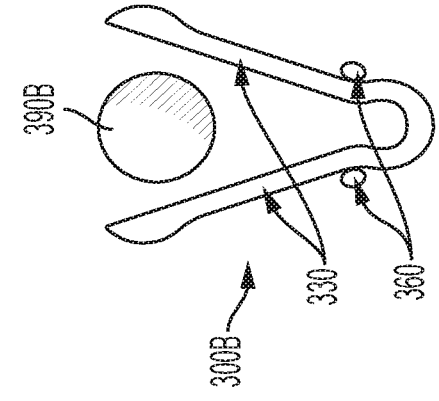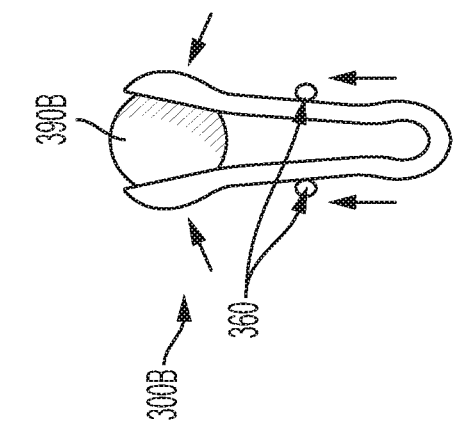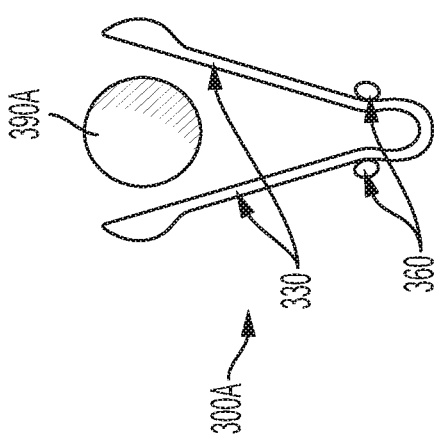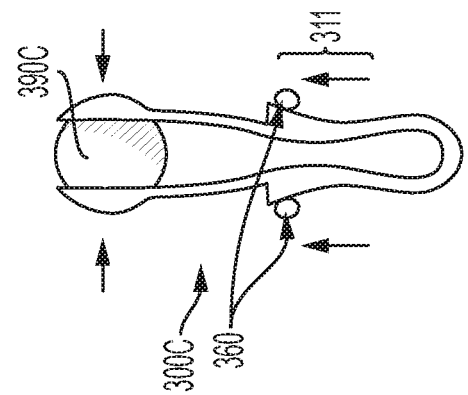

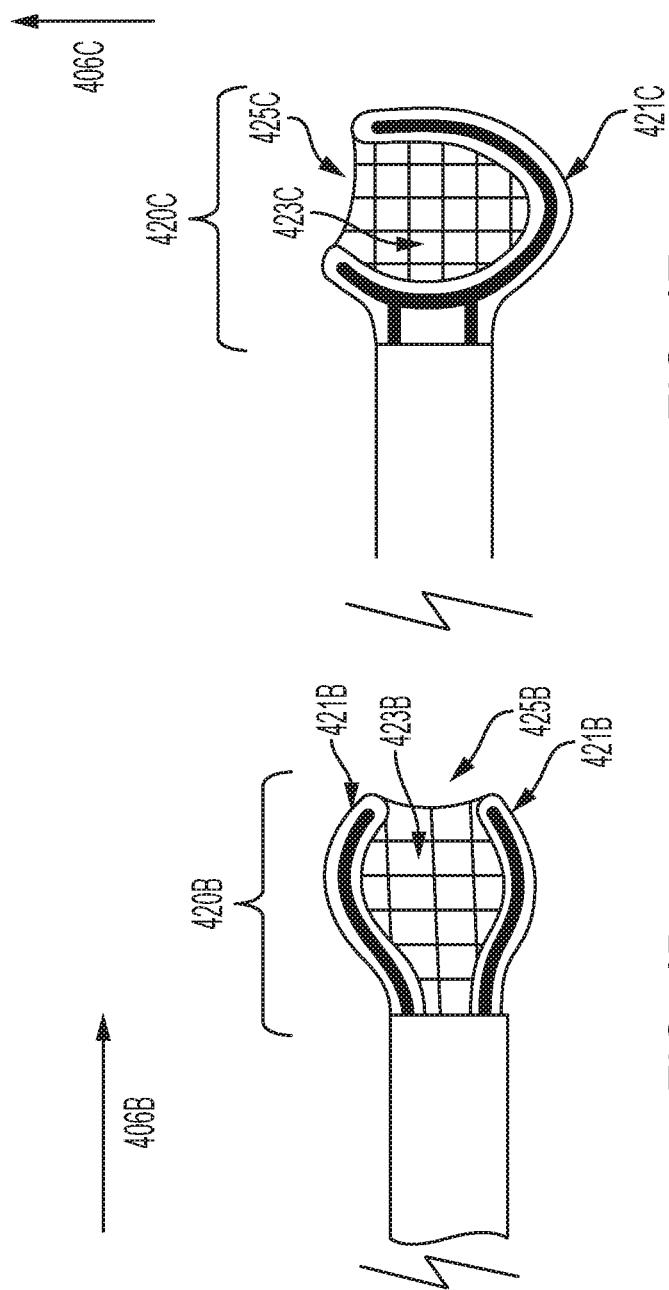

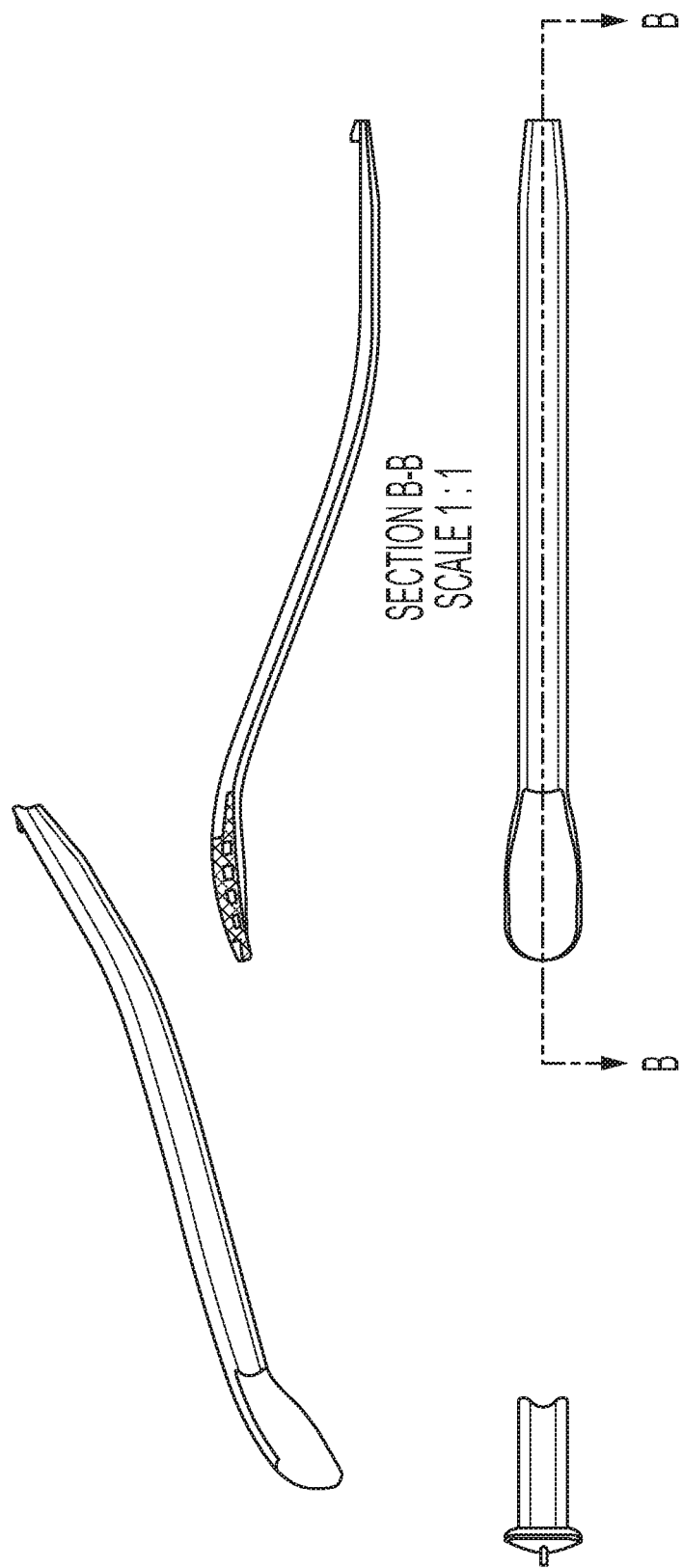

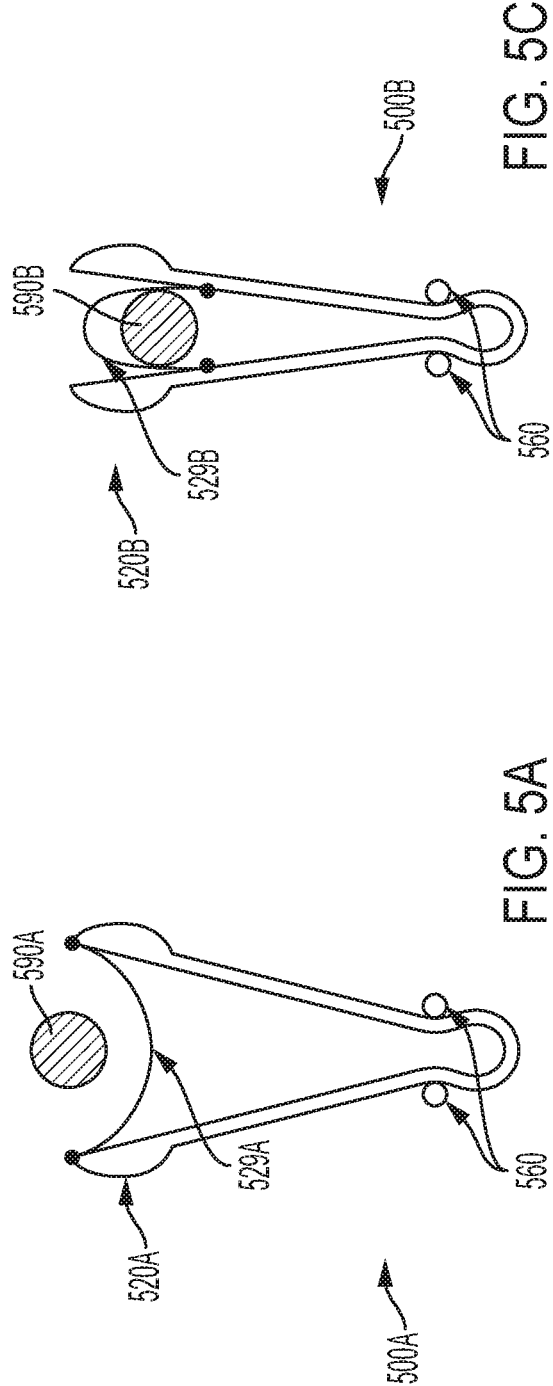
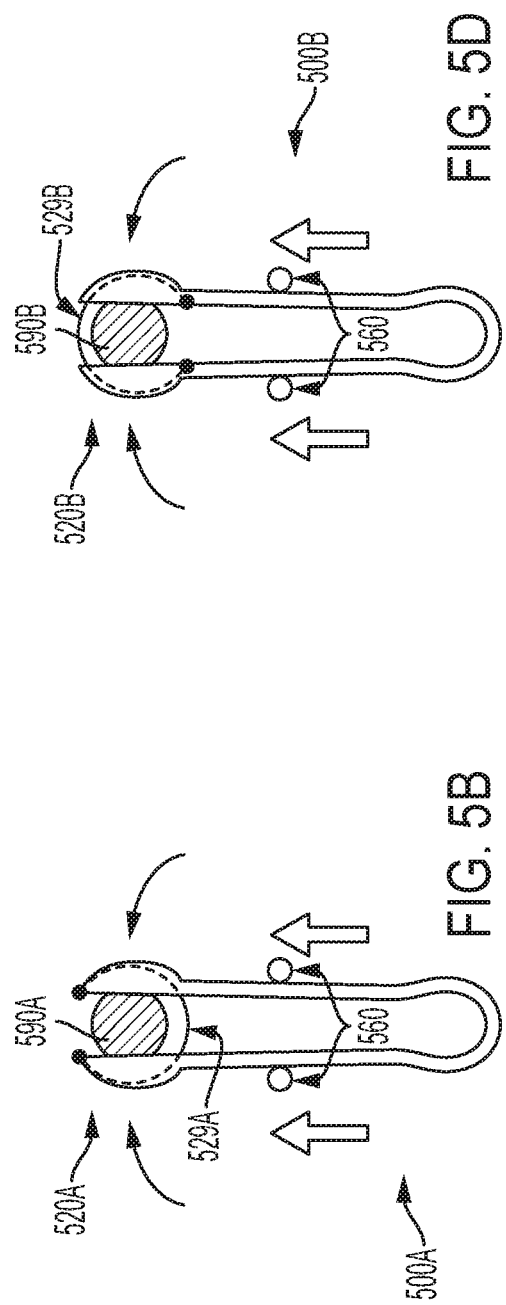

GRIPPER WITH TUNABLE COMPLIANCE FOR DEXTEROUS OBJECT MANIPULATION

CROSS-REFERENCE TO RELATED APPLICATION

This application claims the benefit of priority under 35 U.S.C. § 119(e) to U.S. Provisional Patent Application Ser. No. 62/690,080, filed on Jun. 26, 2018.

TECHNICAL FIELD

Embodiments of the present invention relate to robotic object grasping and manipulation tools.

BACKGROUND

With the advent of hydroponic, vertical farming, and urban farming, a new wave of technology has been infused into food production. Some of these technologies include automated farming tools for irrigation and other crop care processes. However, automation of fruits and vegetables harvesting poses significant challenges.

SUMMARY

In accordance with one or more aspects, there is provided a harvesting tool. The harvesting tool may comprise a gripper comprising a set of finger elements constructed and arranged to envelop a target object pertaining to agricultural produce. The harvesting tool may comprise a manipulator carriage configured to actuate the gripper during operation to grasp the target object.

In some embodiments, the gripper is interchangeable with respect to the manipulator carriage.

In some embodiments, the manipulator carriage is configured to linearly actuate the gripper during operation.

In some embodiments, the manipulator carriage comprises a lead screw, a shuttle, and a pair of cam followers whereby, in operation, rotation of the lead screw causes the shuttle to travel linearly along an axis of the lead screw which, in turn, causes the pair of cam followers to move along the length of the set of finger elements to actuate the gripper.

In some embodiments, the pair of cam followers comprises wheeled rollers.

In some embodiments, the manipulator carriage is constructed and arranged to avoid operational interference due to environmental interaction.

In some embodiments, the manipulator carriage is characterized by at least one operational parameter which correlates to a desired force to be applied to the target object.

In some embodiments, the harvesting tool is configured to exert a level of force on the target object that is below a threshold level.

In some embodiments, the set of finger elements is configured to accommodate a requirement associated with the target object.

In some embodiments, the set of finger elements is configured to accommodate a requirement associated with an agricultural environment.

In some embodiments, the set of finger elements comprises a plurality of finger elements.

In some embodiments, each of the set of finger elements is characterized by at least one of a beam stiffness, impedance, or torsional resistance value which correlates to a desired force to be applied to the target object.

In some embodiments, each finger element comprises a beam, and an attachment portion at a proximate end of the beam relative to the manipulator carriage.

In some embodiments, each finger element has a beam cross-section profile designed to minimize material usage while enabling a desired force to be applied to the target object.

In some embodiments, the set of finger elements are jointed.

In some embodiments, the set of finger elements are contoured to facilitate grasping of the target object.

In some embodiments, each finger element comprises an engagement surface at a distal end relative to the manipulator carriage to facilitate grasping of the target object.

In some embodiments, each finger element comprises a conformable feature at the engagement surface to facilitate grasping of the target object.

In some embodiments, the engagement surface is characterized by an enveloping curve radius oversized by about 1.25 to about 1.5 times a size of the target object.

In some embodiments, the engagement surface is defined by a surface area apt to enter a cluttered environment.

In some embodiments, the engagement surface is defined by a surface area apt to singulate a target object while avoiding damage of the target object.

In some embodiments, the engagement surface has a frontal profile defined by a pointed cross-section.

In some embodiments, the frontal profile transitions to a paddle shape along a length of the engagement surface.

In some embodiments, the engagement surface comprises a conformal pad configured for load spreading and to increase grasp adhesion with respect to the target object.

In some embodiments, the conformal pad has a high surface area relative to the overall engagement surface.

In some embodiments, the conformal pad is overmolded on the engagement surface.

In some embodiments, the conformal pad comprises an elastomeric material.

In some embodiments, a beam of the finger element comprises a thermoplastic material.

In some embodiments, the engagement surface is constructed and arranged such that a small deformation of the conformal pad provides substantially even surface contact on a grasped target object.

In some embodiments, the conformal pad is textured.

In some embodiments, the conformal pad is received by the engagement surface at a distal end of the finger element.

In some embodiments, the engagement surface has a thin profile and/or cross-section to facilitate maneuverability within an agricultural environment.

In some embodiments, the engagement surface comprises an outer profile and an elastic membrane inner profile configured to deform around the target object.

In some embodiments, the outer profile of the engagement surface defines a gap.

In some embodiments, the engagement surface comprises a fork-like structure.

In some embodiments, tines of the fork-like structure are characterized by varying beam stiffness or shape.

In some embodiments, each finger element is defined by a contour including an angled contour surface protrusion.

In some embodiments, each finger element is characterized by a pre-curvature.

In some embodiments, each finger element has a contour surface profile associated with a desired force behavior for the tool.

In some embodiments, the contour surface profile has a ramp-like shape.

In some embodiments, the contour surface profile is nonlinear.

In some embodiments, the nonlinear profile is configured to provide a first force during picking of the target object and a second force that is less than the first force for transportation of the target object subsequent to picking.

In some embodiments, the contour surface profile is characterized by a Bézier spline curve.

In some embodiments, the contour surface profile is integral to the finger element.

In some embodiments, each finger element includes an interchangeable contour surface profile unit.

In some embodiments, a finger element beam design and contour surface profile cooperate to substantially control an absolute force applied to the target object.

In some embodiments, the harvesting tool may further comprise at least one sensor.

In some embodiments, the sensor pertains to force, motion, position, velocity, pressure, contact, or other operational parameter.

In some embodiments, the harvesting tool comprises a deformable member bridging the set of finger elements.

In some embodiments, the manipulator carriage comprises an additional mechanistic element to achieve closure and/or a desired force behavior with respect to the set of finger elements.

In some embodiments, the harvesting tool may further comprise a biasing element.

In some embodiments, each finger element includes one or more reinforcing members along at least a portion of its length.

In some embodiments, the harvesting tool may further comprise a damping element.

In some embodiments, the harvesting tool is removably receivable by a robotic arm.

In some embodiments, the target object is located in an agricultural environment.

In some embodiments, the target object is a tomato, pepper, or cucumber.

In some embodiments, the harvesting tool is configured to remove the target object from a vine.

In some embodiments, the harvesting tool is configured to grasp the target object while substantially avoiding obstructions.

In accordance with one or more aspects, there is provided a harvesting system. The harvesting system may comprise a robotic arm. The harvesting system may further comprise a harvesting tool as described herein operatively attached to the robotic arm.

In some embodiments, the robotic arm may further comprise a multi-degree-of-freedom robotic manipulator.

In some embodiments, the system may further comprise a second robotic arm and a second harvesting tool operatively attached to the second robotic arm.

In some embodiments, the system may further comprise a second harvesting tool operatively attached to the first robotic arm.

In some embodiments, the system may further comprise a controller programmable to operate the robotic arm and/or the harvesting tool.

In some embodiments, the system may further comprise a processor programmable to identify, locate, and/or position a target object.

In some embodiments, the processor is programmable to estimate ripeness of a target object.

In some embodiments, the processor is programmable to visualize an environment or a target object.

In some embodiments, the controller is programmable to position the set of finger elements in proximity of the target object to facilitate harvesting thereof.

In some embodiments, the controller is programmable to actuate the manipulator carriage to achieve a predetermined degree of closing of the set of finger elements.

In some embodiments, the predetermined degree of closing correlates to at least one parameter of the target object.

In some embodiments, the predetermined degree of closing correlates to a size or a geometry of the target object.

In some embodiments, the controller is programmable to actuate the manipulator carriage at a variable speed.

In some embodiments, the controller is configured to detach a grasped target object from a vine.

In some embodiments, the controller is configured to release the target object.

In some embodiments, the controller is configured to place the target object at a desired location.

In some embodiments, the controller is configured to deliver the target object to a downstream process.

In some embodiments, the controller is configured to manipulate the harvesting tool to sequentially envelop, grasp, detach, and remove the target object from an environment.

In some embodiments, the controller is configured to be calibrated.

In accordance with one or more aspects, there is provided a method of harvesting a target object. The harvesting method may comprise enveloping the target object with a set of finger elements associated with a harvesting tool as described herein. The harvesting method may further comprise grasping the target object with the set of finger elements. The harvesting method may still further comprise dislodging the grasped target object. The harvesting method may comprise removing the target object from a surrounding environment.

In some embodiments, the method may further comprise identifying and/or locating the target object.

In some embodiments, the method may further comprise assessing ripeness of the target object.

In some embodiments, the method may further comprise selecting at least one characteristic of the plurality of finger elements based on at least one parameter associated with the target object and/or related environment.

In some embodiments, environmental obstructions are substantially avoided.

In some embodiments, the method may further comprise releasing and/or delivering the target object to a downstream process.

In some embodiments, the target object is enveloped, grasped, dislodged, and removed in series.

In some embodiments, a force level that is less than a threshold level is exerted on the target object during harvesting.

Presented are exemplary embodiments of an object grasping and manipulation tool and methods of operating the same. The tool may utilize an actuated cam mechanism and compliant grippers to accomplish finessed grasping of delicate and easily crushable objects (such as fruits and vegetables) without the need for sensor feedback, complex precision mechanisms, and precisely controlled electric or pneumatic actuators to accomplish the same task.

According to some embodiments, a gripper with different contours and designs allow a common actuation mechanism to accomplish a wide variety of motions, force application profiles, and manipulation of different objects by only interchanging the compliant grippers.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIGS. 3A-3L show tong grippers with various contour surfaces and cross sections, according to some embodiment.

FIGS. 4A-4H show various engagement surfaces, according to some embodiments. FIG. 4K presents details of a high surface area contact pad in connection with a finger element engagement surface in accordance with one or more embodiments.

FIGS. 5A-5H show tong grippers with deformable members, according to some embodiments.

DETAILED DESCRIPTION

Figure 1A:
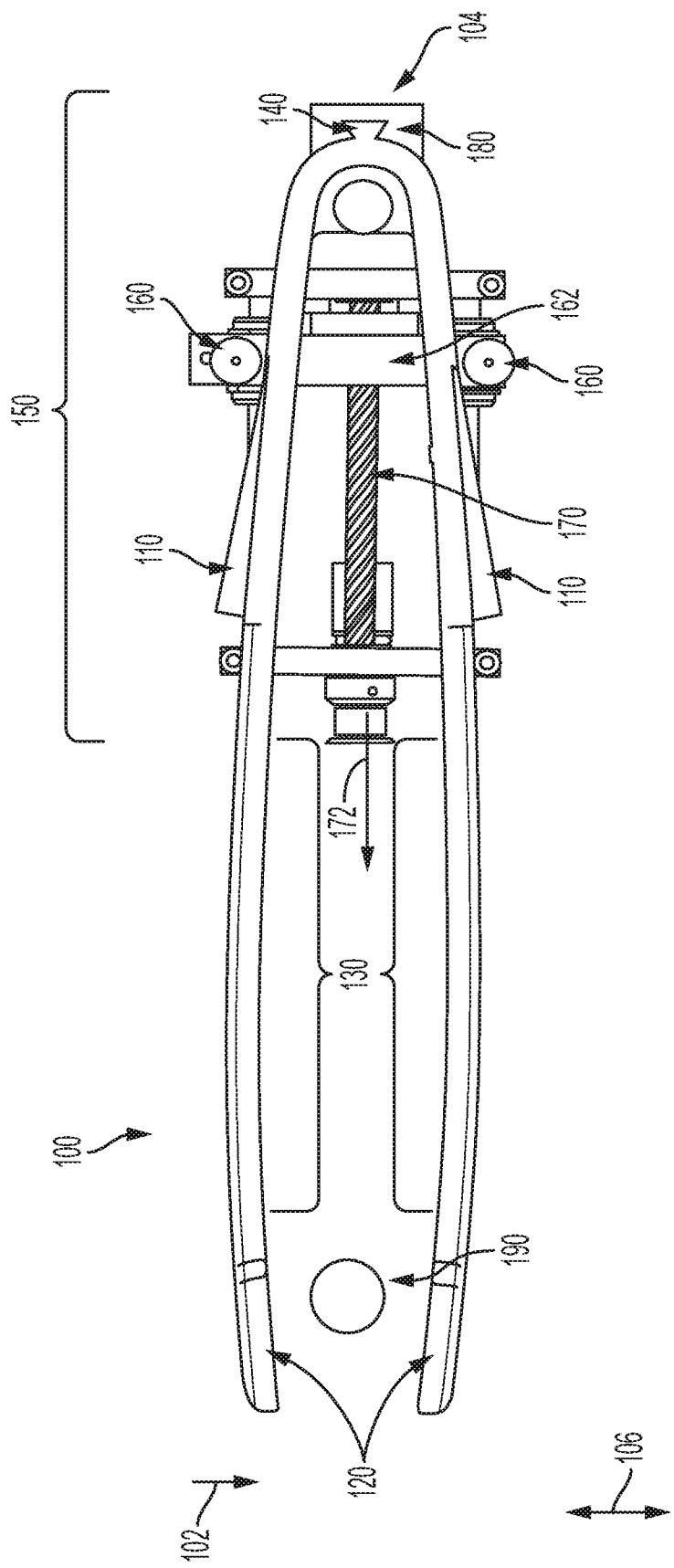
FIGS. 1A-1B show an exemplary tong gripper grasping an object, according to an embodiment.

In accordance with one or more embodiments, robotic grasping and manipulation tools are disclosed along with related systems and methods. In some embodiments, a target object may be picked in place, i.e. from a target surface or a target location. In various embodiments, a grasped and/or dislodged target object may be removed from an environment, i.e. an agricultural environment.

In accordance with one or more embodiments, a wide variety of target objects may serve as an intended workpiece. Target objects may vary in terms of their size, geometry, firmness, and various other properties. In some embodiments, the target object may generally be characterized as delicate or otherwise easily crushable. In at least some embodiments, the target object may pertain to agricultural produce, e.g. the target object may be a fruit or a vegetable. In some specific non-limiting embodiments, the target object may be a tomato, pepper, or cucumber.

In accordance with one or more embodiments, a target object may be present in a variety of environments or settings. In some embodiments, the target object may be in an agricultural environment. In other embodiments, the target object may be in an industrial environment. The environment or setting of the target object may be indoors or outdoors. In some embodiments, the target object may generally be loose in the target environment. In other embodiments, the target object may be attached or tethered such as to a host in the target environment. For example, a target object may pertain to agricultural produce on a plant, e.g. a vine, for ripening. In accordance one or more embodiments, a harvesting tool may be used to perform one or more of the following functions with respect to a target object: grasping, dislodgment, and/or removal. A target object may be enveloped and grasped. If required, a grasped target object may generally be dislodged in place. For example, a target object may be a tomato on a vine. The tomato may be grasped and dislodged from the calyx of the vine. In other embodiments, dislodgment may not be necessary. Removal or repositioning of the grasped target object relative to the environment may be desired.

In accordance with one or more embodiments, a harvesting tool may generally include a gripper comprising a set of finger elements constructed and arranged to envelop a target object pertaining to agricultural produce. The tool may also generally include an actuator, such as a manipulator carriage, configured to actuate the gripper during operation to grasp the target object. The term "harvesting" may be used herein to generally refer to both harvesting and picking operations. Related systems and methods are also described herein for robotic grasping tools. In one non-limiting implementation, the robotic grasping tool is in the form of tongs, also called "tong grippers" herein. The term "tongs" or "tong grippers" may be used throughout herein in connection with various embodied harvesting tools regardless of the number of finger elements which are incorporated into its construction. The tong grippers may be individually designed to contour to particular objects and to produce conformal contact. Various parameters of the finger elements may be manipulated and selected for as described herein to generally control a force profile applied to a target object by the tool during actuation. The finger elements may generally be designed herein to accommodate and optimize for various target objects. In this regard, a series of different grippers may beneficially be interchangeable with respect to the actuator for flexibility in terms of customizable operation. The tong grippers may have a contour surface that interfaces with cam followers on an actuator moving carriage to provide for custom motion, travel, and/or force profiles during actuation. A deformable member may be affixed to the tong grippers to more selectively grasp individual objects in a cluttered environment. Additional biasing elements may be added to the tong grippers or moving carriage to facilitate particular motion, travel, and/or force profiles during actuation. Grasping mechanisms may also include more than two grasping arms. According to some embodiments, the same actuator moving carriage can interface with a variety of different tong grippers that are designed to grasp different objects.

Figure 1B:
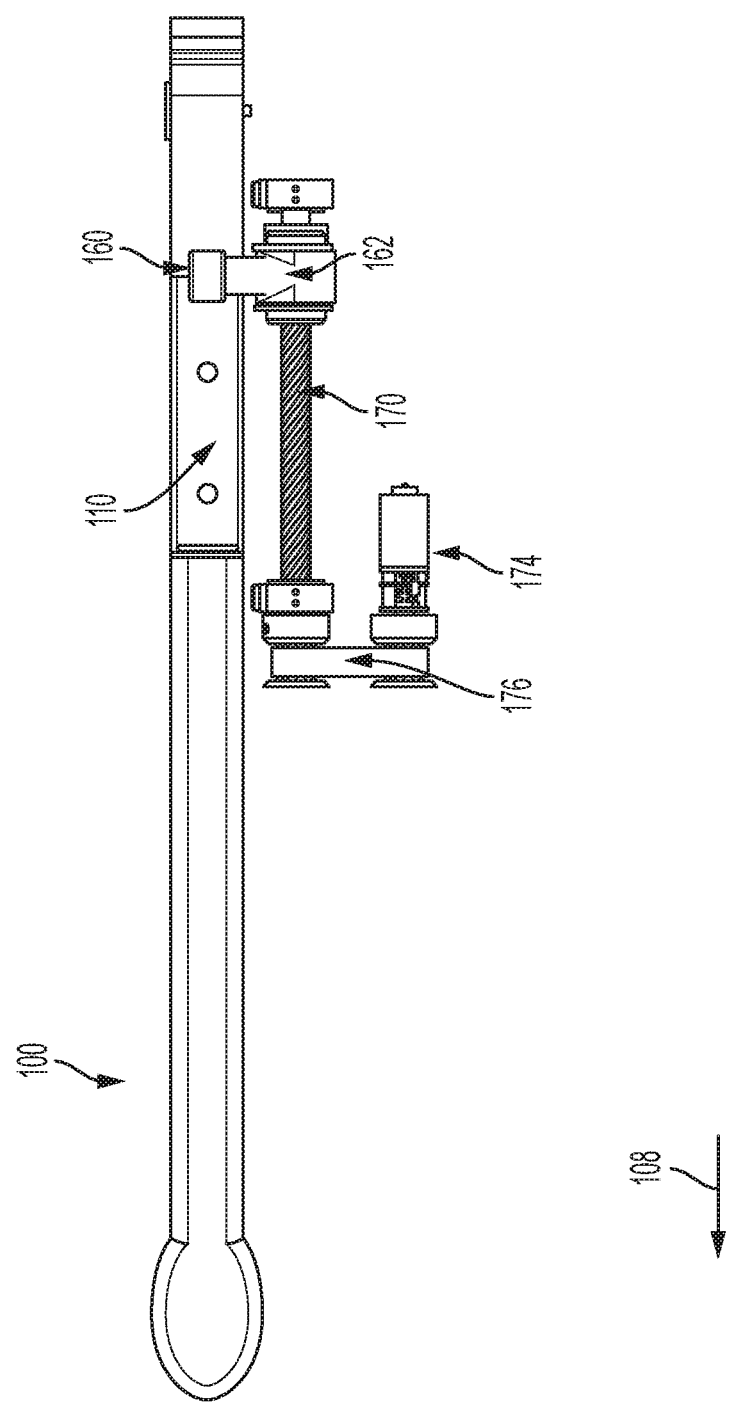

In accordance with one or more embodiments, a gripper may generally include a set of finger elements constructed and arranged to envelop a target object pertaining to agricultural produce. Each finger element may generally include a beam or arm having an engagement surface at a distal end and a mounting feature at a proximate end. The mounting feature may generally interface with various actuators as described herein. The actuator may generally cooperate with the set of finger elements to grasp a target object. Specifically, the beams of the finger elements may be manipulated via the actuator to bring the engagement surfaces into contact with the target object. The design and/or composition of both the beams and the engagement surfaces as described herein may impact and/or define a force profile and associated interaction exerted on the target object by the tool. FIGS. 1A and 1B shows an exemplary tong gripper positioned to grasp an object, according to an embodiment. The exemplary embodiment shown in FIG. 1A includes two parts: the compliant tong gripper 100 and a manipulator carriage 150 including a pair of cam followers 160, such as vertical wheeled rollers. According to an embodiment, tong gripper 100 includes engagement surfaces 120 at a distal end 102 of the tong gripper 100, a tong mounting feature 140 at a proximal end 104 of the tong gripper 100, tong arms 130 between the distal end 102 and the proximal end 104 of the tong gripper 100 adjacent to the engagement surfaces 120, and contour surfaces 110 between the distal end 102 and the proximal end 104 of the tong gripper 100 near the tong mounting feature 140. According to an embodiment, manipulator carriage 150 includes a pair of cam followers 160 on shuttle 162, a lead screw 170, and a tong mounting receiver 180 for engaging with the tong mounting feature 140.

As shown in FIG. 1A, the tong gripper 100 sits on top of the manipulator carriage 150. Tong mounting receiver 180 engages with tong mounting feature 140 to secure central placement of the tong grippers 100 on the manipulator carriage 150. In addition, cam followers 160 contact contour surfaces 110. As discussed below, motion of the cam followers 160 along contour surfaces 110 cause grasping motion of the tong grippers 100.

During operation, lead screw 170 is rotated via, for example, an electronic motor. Rotation of the lead screw 170 causes the shuttle 162 to move linearly in a forward or backward direction along the axis of the lead screw 172. As shuttle 162 moves, cam followers 160 travel along contour surfaces 110 on the sides of the tong grippers 100 to cause compression or decompression on an axis 106 substantially perpendicular to the lead screw axis 172. Accordingly, the pair of cam followers 160 can actuated forward or backward in the direction of the lead screw axis 172 by a single simple, inexpensive, and low precision lead screw mechanism 170 and electric motor to cause actuation of the tong grippers 100. It should be appreciated that while the embodiment of FIG. 1 shows the cam followers 160 moving in a linear motion, cam followers may be designed to follow different paths. For example, cam followers 160 may move along a track that causes deviation in the direction 106, such as outward from the lead screw axis 172 or inward toward the lead screw axis 172.

The stiffness of the tong arms 130, the profile of the contour surfaces 110, and the design of the tong engagement surfaces 120 that interface with the grasping target 190 all are used to control and distribute the force applied to the grasping target 190. Since the forces developed against the grasping target 190 are influenced primarily by the stiffness and bending profile of the tong arms 130 and other components of the tong gripper 100 as well as the shape of the contour surfaces 110, the precision of the cam followers 160 driving mechanism (e.g., electronic motor driving lead screw 170) does not affect the tong gripper 100's overall accuracy or effectiveness. As shown in FIG. 1B, an electromechanical linear actuator is used, such as the lead screw 170 and associated motor 174. As shown in FIG. 1B, a motor 174 produces rotational motion, which is transferred via transfer device 176, such as, but not limited to a belt or chain, to the lead screw 170. As lead screw 170 rotates, it causes the shuttle 162 to travel in direction 108. This causes cam followers 160 to run along contour surfaces 110 to cause actuation of the tong grippers 100. However, it is contemplated that alternate embodiments of linear actuation can be used. These may include but are not limited to: a mechanism for quickly releasing stored energy from a compressed spring or pneumatic cylinder (which enables a very fast grasp or release followed by a substantially slower process which recycles the energy stored in the spring or cylinder via a separate linear actuator or compressed air source), an active pneumatic piston whose position is controlled via differential pressures or via simple mechanical stops, motor driven linear actuation mechanisms other than lead screws (such as rack and pinion, reciprocating rack and pinion, or timing belt driven linear actuators), or motor driven linkages and mechanisms, which indirectly translate rotational motion to linear motion (such as four-bar linkages, crank slider linkages, scotch yoke mechanisms, or cylindrical grove cam follower mechanisms). According to some embodiments, if the linear position of the cam followers 160 is controlled, even finer adjustment of the tong gripper's 100 overall compression against the grasping target 190 may be obtained, and by extension the resultant force applied to the grasping target 190 may be more accurately controlled. However, beneficially, forces on the grasping target 190 may be primarily controlled based on the shape and design of the tong gripper 100. [0001] Tool designs utilizing this approach present several advantages relevant to the food processing automation and agricultural industries, but are applicable elsewhere as well. At least some of these advantages are listed below.

First, since only a single component (the tong gripper 100) touches the grasping target 190 (e.g., a food item such as a tomato), that component is the only component whose surfaces will need to be cleaned and sanitized frequently and thoroughly. To enable cleaning, the tong grippers 100 can be designed to be quickly removed from the underlying cam follower drive mechanism without complicated tools. For example, as shown in FIG. 1, the tong gripper 100 has tong mounting feature 140 which assists in holding the tong gripper 100 to the manipulator carriage 150 by interfacing with tong mounting receiver 180.

Second, the tong gripper 100 can be designed to have simple, open, and easy to clean features that are free of cracks, crevices, and tight corners that can harbor viruses and bacteria. In some embodiments the tong gripper 100 is made from a single molded piece of plastic or a molded piece of plastic with over molded elastomer material on the engagement surfaces 120 of the tong gripper for gripping. Since tong gripper 100 is not a multi-component mechanism filled with embedded or moving parts, it can be easily cleaned and sanitized or alternatively exchanged as a disposable wear component. These tong grippers 100 can be constructed from materials or composites of materials which are compatible with standard industry cleaning processes, frequent food contact, and can meet common regulatory safety standards for direct food contact. Common cleaning compositions in the relevant industry for sanitation, cleaning, and/or disinfection include various quaternary cleaners, bleaches, weak acids, and UV light. Some examples include but are not limited to, 303/304/316 passivated stainless-steel alloys; food safe formulations of plastics such as polyethylene, acetal, polypropylene, PET; and elastomers such as silicone or TPEs.

Third, the more complicated and difficult to clean cam follower drive mechanism (e.g., driving components manipulator carriage 150) can be easily sealed from the environment and need not be constructed from materials designed explicitly for food contact. This physical separation of elements permits the cam follower drive mechanism along with its optional feedback sensors and controlling electronics to be constructed from lower precision and lower quality parts (since grasping force and motion are determined primarily by the design, material selection, and shape of the tong gripper) and designed without consideration for exposure to corrosive environments or cleaning agents, which has the overall effect of dramatically reducing the up-front and maintenance cost of manipulators suitable for applications in food processing automation and agriculture.

Figure 2A:
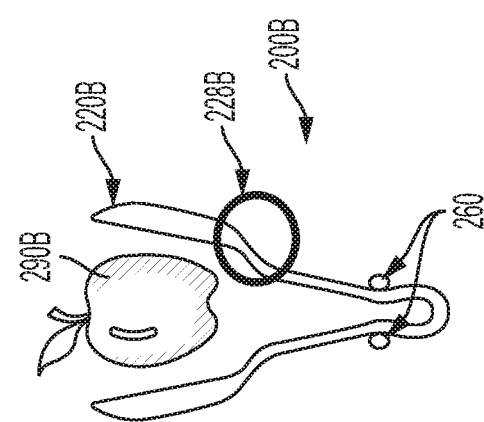
FIGS. 2A-2D show tong grippers with various engagement surfaces for different objects, according to some embodiments.
Figure 2B:
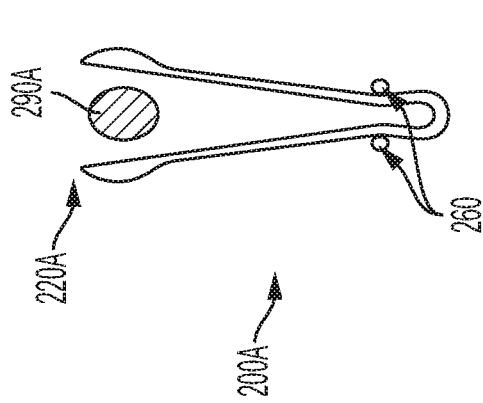
Figure 2C:
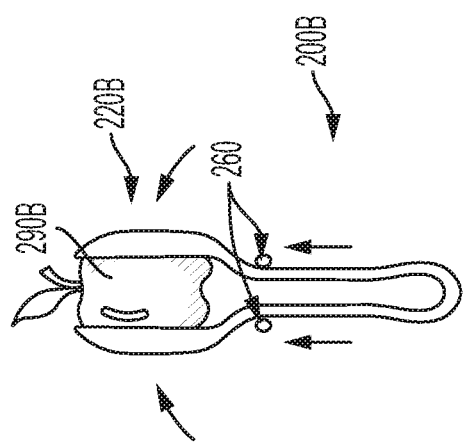
Figure 2D:
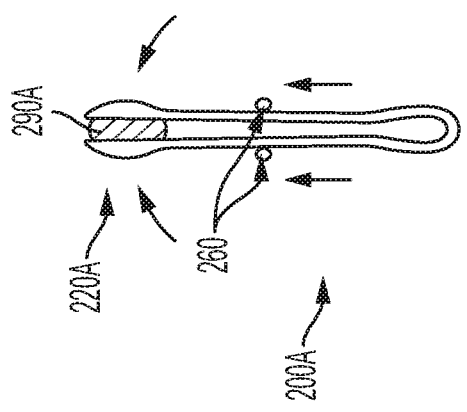

Since the tong grippers 100 may be removable, and tong grippers 100 with different engagement surfaces 120 and contour surfaces 110 can be actuated by the same drive mechanism but impart very different motion and force profiles, it is possible to exchange the tong grippers 100 to reconfigure the gripper to grip a new class of item. For example, FIGS. 2A and 2B show tong gripper 200A for grasping small objects, such as a grape tomato 290A, while FIGS. 2C and 2D show tong gripper 200B for grasping larger objects, such an apple 290B. Various small grasping targets such as grape tomatoes or cherry tomatoes may in some non-limiting embodiments, for example, range in weight from about 5 to about 30 grams, range in height from about 15 to about 50 mm and range in width from about 15 to about 40 mm. Non-limiting examples of small grasping targets for agriculture may include picked fruits such as tomatoes, strawberries, raspberries, and grapes, vegetables such as cucumbers, peppers, and other small individual produce items such as mushrooms. Various large grasping targets may have a weight up to about 250 to about 500 grams. Non-limiting examples may include beefsteak tomato, apple, pepper, beet, squash, zucchini, pumpkin or other types of picked produce. As shown in FIGS. 2A and 2B, the engagement surfaces 220A are designed to be conformal for a grape tomato 290A. As shown in FIGS. 2C and 2D, engagement surfaces 220B are designed to be conformal for an apple 290B. FIGS. 2A-2D all show tongs engaging with the same cam followers 260 (with the remaining elements of the manipulator carriage omitted for clarity). FIG. 2A shows tong gripper 200A in an open position with cam followers 260 toward the proximal end. As cam followers 260 move to the distal end, as shown in FIG. 2B, the tong gripper 200A closes in on grape tomato 290A, with engagement surfaces 220A substantially conforming to the contour of the grape tomato 290A. FIG. 2C shows tong gripper 200C in an open position with cam followers 260 toward the proximal end. As cam followers 260 move to the distal end, as shown in FIG. 2D, the tong gripper 200B closes in on apple 290B, with engagement surfaces 220B substantially conforming to the contour of the apple 290B. As shown in FIG. 2C, for larger objects, tong gripper 200B may have an outward deflection 228B. Outward deflection 228B allows for tong grippers 200B to engage with larger objects without having to increase the size of the manipulator carriage or the spacing of the cam followers 260.

Various components of the tong grippers can be designed to achieve different magnitudes of force application against the grasping target, force application in different directions, and complex embedded grasping motions or "force profiles" which can be controlled by modulating the speed and position of the cam followers. The design and composition of the finger elements, including the beams and the engagement surfaces may largely contribute to defining the force profile and target object interaction. Relevant considerations include a desire to achieve firm gripping without damaging a target object, as well as the ability to navigate potentially crowded environments, such as agricultural environments, in which it may be desirable to avoid obstructions as well as to singulate a target object. Further control may be achieved via manipulation of the actuator in cooperation with the gripper. In terms of the beam, cross-section, thickness, and/or contour profile may be significant parameters. The beam cross-section may generally be optimized so as to minimize overall material usage while achieving a desired force profile applied to a target object. The cross-section and/or contour profiles may need to be adjusted proportionally to accommodate different materials used to manufacture the beam, such as to enhance chemical resistance or moldability. Different materials may have different elasticity, stiffness, impedance, or torsional resistance values that may all be optimized and/or compensated for along with cross-section and contour profiles. In some non-limiting embodiments, the beams of the finger elements may be constructed of a thermoplastic material, for example, Polylactic Acid (PLA) or Acrylonitrile Butadiene Styrene (ABS) material. Various polycarbonate materials may be implemented. In at least some embodiments, the beams of the finger elements may be 3-D printed, i.e. via Fused filament fabrication (FFF), Fused Deposition Modeling (FDM) and/or Stereolithography (SLA). The beams may involve a multi-part or multi-layer construction. The beams may be jointed. FIGS. 3A-3F show three different tong grippers 300A, 300B, and 300C with different cross sections and profiles. As shown in FIGS. 3A and 3B, tong grippers 300A have a thin and substantially uniform cross-section except at the distal end for gripping, according to some embodiments. In this case, the thin cross section is easily deflected by the cam followers 360 as shown in FIG. 3B, and therefore a very small squeezing force is exerted against the grasping target 390A.

FIGS. 3C and 3D show an alternate tong gripper 300B with a thicker substantially uniform cross-section, according to some embodiments. FIG. 3C shows the tong gripper 300B in an open position, while FIG. 3D shows the tong gripper 300B in a closed position. In this case, the force which must be applied by the cam followers 360 is moderately increased (since the angle of contact is nearly perpendicular to the direction of travel) but the force developed against the grasping target 390B is greatly increased, since the thicker tong gripper 300B does not deflect as easily as the tong gripper 300A, as shown in FIG. 3D.

According to some embodiments, the tong grippers may have non-uniform thicknesses along the length of the tong arms 330. For example, tong arms may be thinner in some parts than others. One benefit is that varied thicknesses allow for control the point(s) of deflection, thereby controlling the angle of the force on the grasping target. According to some embodiments, the tong arms 330 may have a non-prismatic cross-sections. For example, reinforcing members could be placed along a portion (or along the entire) length of the tong arms 330. This may take the form of reinforcing ribs, for example.

As shown in FIGS. 3E and 3F, the tong gripper 300C can be given more complex profiles such as angled contour surface protrusions 311 to change the angle of force application against the grasping target 390C and to amplify the tongs' range of motion, according to some embodiments. FIG. 3E shows the tong gripper 300C in an open position, while FIG. 3F shows the tong gripper 300C in a closed position. As shown in FIG. 3E, the gripping surfaces are given a pre-curvature 326 which angles them slightly inward. This ensures that, in the actuated and deflected state, they make flat or perpendicular contact with the grasping target 390C, as shown in FIG. 3F. This is due to the fact that, as the tong grippers compress, the relative angle between the arms decreases. Furthermore, when contact is made with the grasping target, the arms may splay outwardly. As shown in FIG. 3F, the pre-curvature 326 angles the engagement surfaces slightly inward to account for this splaying effect. Additionally, the angled contour surface protrusions 311 of the tong gripper 300C in the region where the cam follower mechanism makes contact with the tong have also been altered to increase the rate at which the tong gripper 300C is compressed and closed per unit distance traveled by the actuated cam followers 360. This can be utilized either to increase the overall range of motion and level of compression/force achieved or, in conjunction with position control of the actuated cam followers, amplify the speed at which the tongs achieve the same level of compression as a set of tongs which does not have an altered engagement surface (such as in the case of the other two embodiments from this figure). The relative cross section, material, shape, and size of the tong grippers as well as the shape and size of angled contour surface protrusions can help to deliver customized closing rate, direction, and force.

Figure 3I:
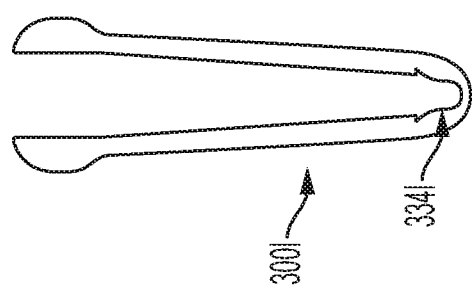
Figure 3H:
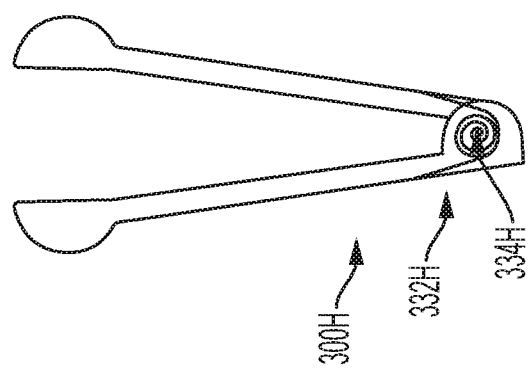
Figure 3G:
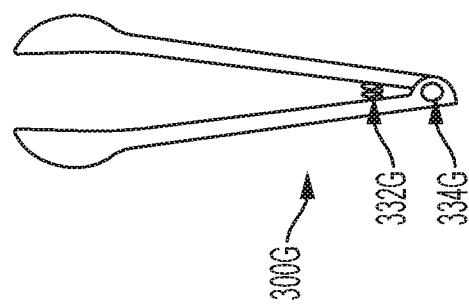
Figure 3L:
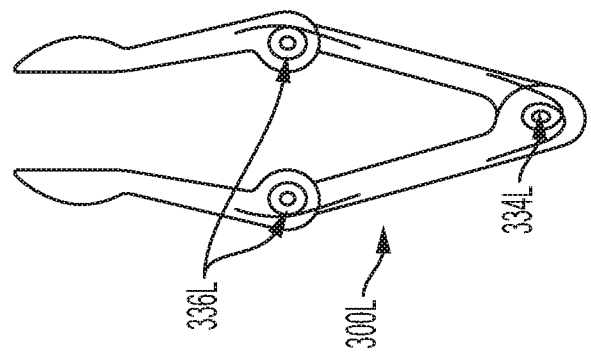
Figure 3K:
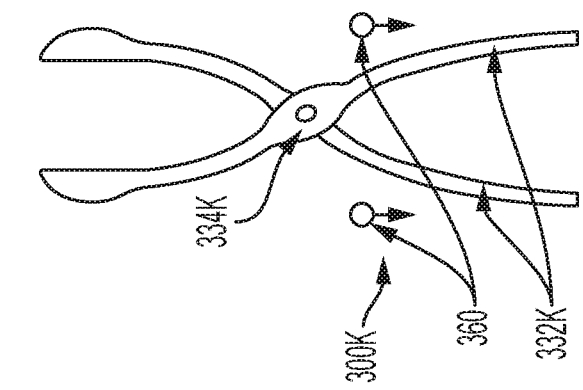
Figure 3J:
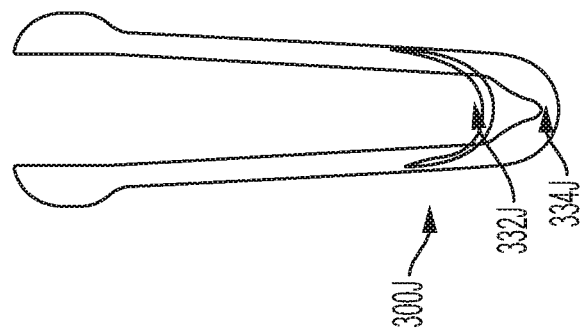

FIGS. 3G-3L show force control mechanisms for tong grippers implementing various forms of hinges and biasing elements, according to some embodiments. FIG. 3G shows a hinge operated set of tong grippers that include a hinge 334G including a fastening element such as a pin or rivet joining the tong arms and a spring 332G that guides the tong arms to an open state when not closed by outside action such as cam followers, according to an embodiment. The force may be controlled by the spring characteristics, spring location, arm thickness and shape, and the distance to which the cam followers travel up the arms. In the first panel, a helical spring element is used. As shown in FIG. 3H, a torsion spring 334H may be wound around the hinge 332H provides opening force to the tong grippers 300H, according to some embodiments. As shown in FIG. 3I, a hinge 334I may be formed integrally with the arms, for example, formed from the same piece of plastic, in a type of design known as a living hinge. The force applied by the grippers 300I may depend in part on bending characteristics of the thin section of material (such as a polymeric material) to provide a hinged motion constraint. For example, thicker or less flexible material may make it more difficult to actuate the tong grippers 300I, thereby causing a lower grasping force whereas thinner or more flexible material may have the opposite effect. FIG. 3J shows another illustrative example of a single molded construction with a solid hinge 334J which further includes a leaf spring element 332J. Leaf spring element 332J adds resistance to actuation of the tong grippers 300J. Leaf spring element 332J could be, for example, insert molded or assembled proximate to hinge 334J of the tong grippers 300J.

FIG. 3K shows an arrangement of tong grippers 300K where the extended arm portions 332K that extend past a hinge 334K. In order to actuate the grippers 300K, the cam followers 360 travel in an opposite direction away from the hinge 334K. Additional force may be provided via a leaf spring at the end of the extended arm portions 332K or in the hinge 334K. Such an arrangement is useful in cases where added length of tong arm is required. In such situations, the intersection of the arms at the hinge 334K allows them to support one another to achieve a required stiffness goals. The arms are also made stiffer by having the pivot point midway through the arms. This allows for the length of the arms to be increased. FIG. 3L shows a variation where additional spring and hinge points 336L are added to the tong grippers 300L in addition to the hinge 334L. This arrangement allows for control over the grasping force that does not depend on the beam bending stiffness of the tong arms. Instead, grasping force is controlled by a spring in the additional spring and hinge points 336L.

It should be appreciated that in any arrangement of a mass and spring, a resonant frequency will naturally occur as the result of the spring stiffness and the mass suspended. To avoid harmonic resonance that can cause destructive vibrations or poorly damped oscillatory movements, a damping element can be included in the system to eliminate the possibility of underdamped movement. In the case of a polymeric or elastomeric construction, the material of the tong arms and grip surface itself can act as a damper when these materials absorb vibrational energy rather than transmit it. By positioning dampening materials such as elastomers within the tong arm, the spring mass damper system of the tong arm can be deterministically overdamped and avoid any degradation of the system's ability to grasp due to vibration.

Figure 4:
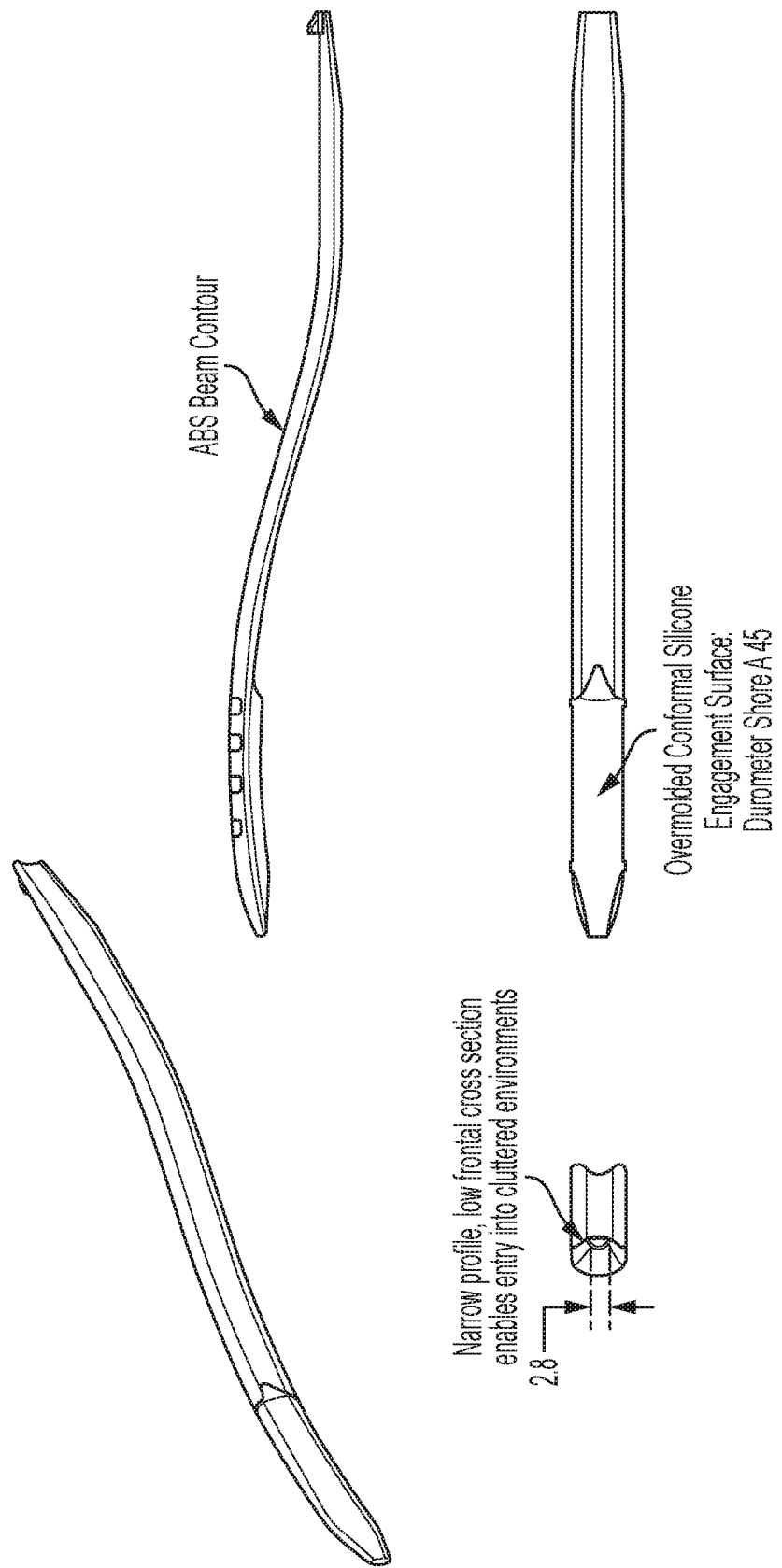
FIG. 4 presents details of various engagement surfaces in accordance with one or more embodiments.
Figure 4C:
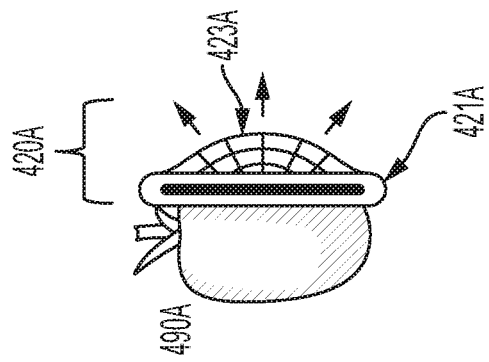
Figure 4B:
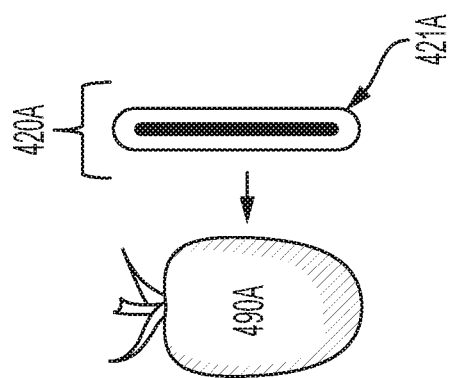
Figure 4A:
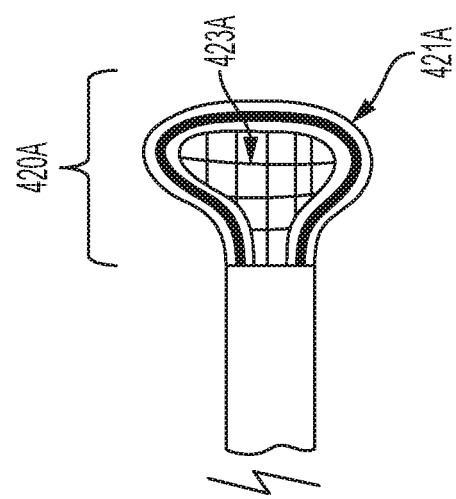

In accordance with one or more embodiments, each finger element may include an engagement surface at a distal end of the beam or arm. The engagement surface may include a conformal contact surface. The shape of the engagement surface as well as the nature of the conformal contact surface may be important design factors in terms of facilitating harvesting operations. With respect to the general shape of the engagement surface, a frontal cross-section may be optimized in order to provide a geometry more apt to enter a cluttered environment. In this way, singulation of a target object from, for example, a group of fruits, vines, and leaves, may be facilitated. This approach may be beneficial in terms of grasping otherwise hard to reach target objects but has the drawback of increasing a point loading pressure possible on a surface of the target object which means that a lower overall grasping force might need to be used in order to avoid causing damage to the target object. The finger element illustrated in FIG. 4 includes close to a point cross-section of frontal profile in the engagement surface and the engagement surface includes a conformal pad that increases grasp adhesion and spreads loading more evenly on the target object. The conformal pad may be overmolded on the engagement surface. The conformal pad may generally be made of an elastomeric material. For example, in some non-limiting embodiments, the conformal pad may be made of a silicone rubber having material properties selected for both conformal performance and durability. The silicone rubber may be specified, for example, to a Shore A 45 durometer. Various catalysts, priming compounds, adhesives, and/or curing agents may be implemented. FIGS. 4A-4H show various embodiments of engagement surfaces, according to some embodiments of the tong grippers. Making conformal contact with a grasping target can improve grip quality without exerting too much force on the grasping target, such as soft fruit. At the same time, having complex contoured gripping surfaces on the tips of the tong has the disadvantage of increasing the cross section of the tips, and, as a result, making it difficult to maneuver the tips into a cluttered environment. Accordingly, a tip may be designed that is thin in cross section but none the less can develop a conformal grasp. For example, FIGS. 4A-4C show an engagement surface 420A that consists of a thin and hard outer profile 421A and an elastic membrane inner profile 423A, according to some embodiments. This trampoline like structure will deform around grasping target 490A shown in FIGS. 4B and 4C.

Since the thin and hard outer profile 421A of the trampoline like engagement surface 420A shown in FIGS. 4A-4C could dent a soft grasping target, it is desirable to make trampoline like engagement surface 420B where the hard-outer profile is present at some but not all points along the edge of the inner elastomeric membrane. FIG. 4D shows an embodiment of an engagement surfaces 420B whose hard-outer profile 421B has a gap 425B. In this case, since the gap 425B is at the outer edge of the engagement surface 420B, it is beneficial to approach a grasping target by moving towards it with the gap 425B as a leading edge in the direction 406B. If the position where the gripping tongs engage the grasping target has an error which would otherwise have caused the edge to dent the grasping target, the presence of the gap 425B in the hard outer profile 421A can avoid this damage by instead contacting the grasping target with the more flexible elastic membrane 423B. FIG. 4E shows a similar trampoline like engagement surface 420C to that shown in FIG. 4D, but with a gap 425C in its hard-outer profile 421C at the top of the engagement surface 420C, according to an embodiment. This provides a similar tolerance to error in the position of engagement with the grasping target as the previous embodiment but oriented such that the grasping target may be safely approached by movement in direction 406C. It is contemplated that in some embodiments the elastic membrane can also be an elastomeric web or net, an inextensible but flexible film or sheet, or an open cell or closed cell foam. It should also be appreciated that the hard outer profile can be a flexible material, and need not be highly rigid. Some exemplary construction materials for the hard outer profile may include but are not limited to, elastomers such as EPDM, TPE, Silicone, and Polyurethane, plastics such as Polycarbonate, ABS, Nylon, Acetal, Polyethylene, Polypropylene, and PTFE, or metal alloys such as spring steel alloys, 303/304/216 passivated stainless steel, aluminum alloys, copper alloys, Hastelloy, Inconel, or any other material selected such that the hardness and stiffness of the outer profile is higher than that of the elastic membrane. The hard outer profile may in some cases be elastomeric and/or nonrigid. Furthermore, it should be appreciated that these materials may not be selected for compatibility with direct food contact where the hard outer profile is completely encased or surrounded by the material used to construct the more flexible elastic membrane 423B.

Figure 4H:
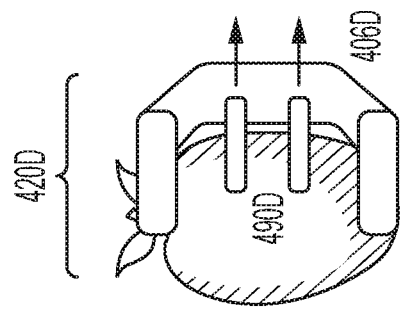
Figure 4G:
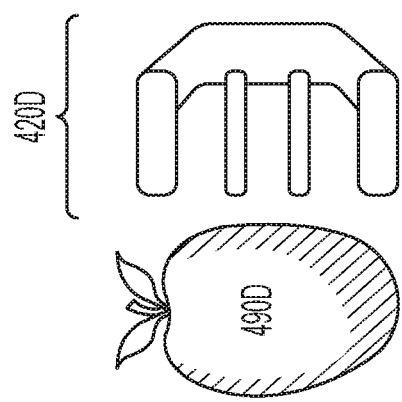
Figure 4F:
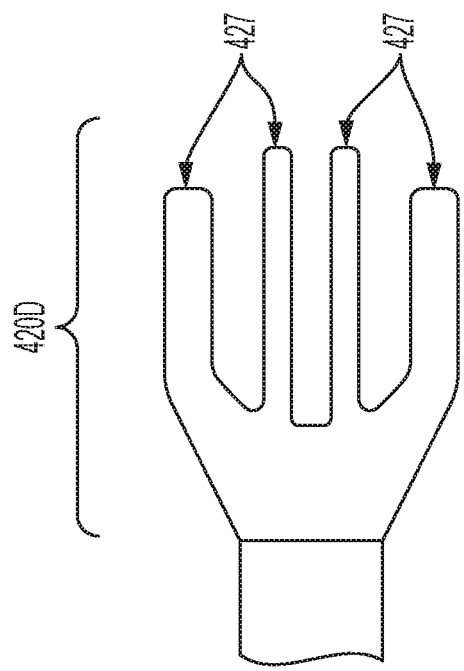
Figure 4I:
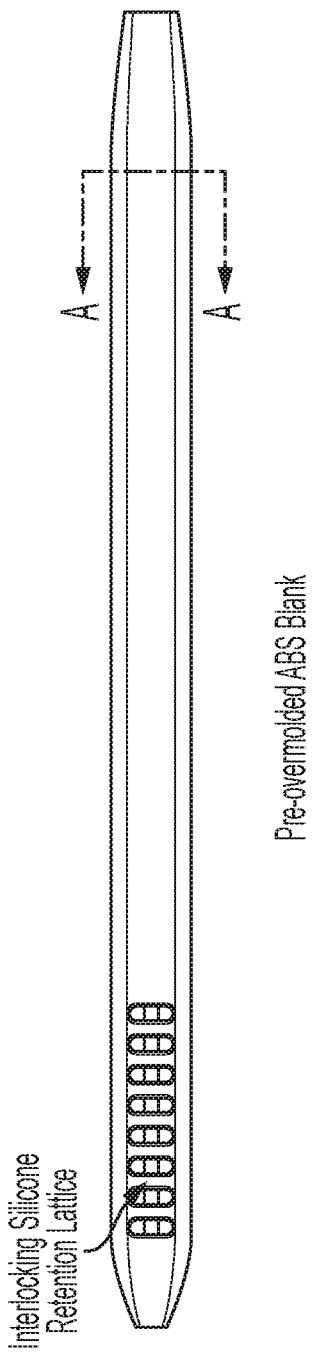
FIG. 4I presents details of a finger element including an interlocking silicone retention lattice at an engagement surface in accordance with one or more embodiments.
Figure 4J:
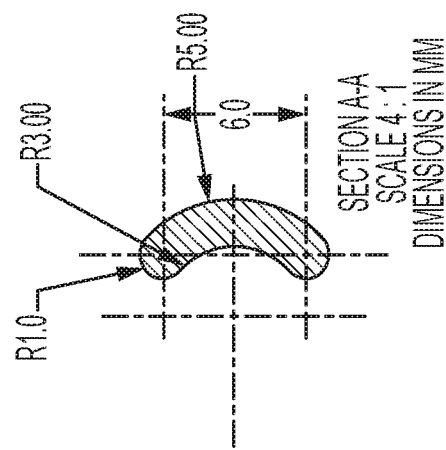
FIG. 4J presents a beam cross-section view of the finger element of FIG. 4I.

FIGS. 4F-4H show another embodiment of an engagement surface 420D that is thin in cross section but can still develop a conformal grip. As shown in FIG. 4F, the engagement surface 420D is a fork like structure with tines 427. The tines 427 of the fork are designed to have a beam stiffness such that they can deflect in a direction 406D when brought into contact with the grasping target 490D, as shown in FIG. 4H. This capacity to deflect upon contact with a grasping target 490D enables the fork like engagement surface 420D to develop more conformal contact with the grasping target while simultaneously reducing the force delivered to the surface of the grasping target 490D. This has the added benefit of preventing damage. It should be noted that the different tines of the fork can be designed with differing beam stiffnesses and shapes. For example, as shown in FIGS. 4F-4H, the two outer tines are thicker than the two inner tines. As a result, the inner tines will be less stiff and more capable of enabling a conformal grip due to their increased ability to deflect. Various design features may be incorporated in order to ensure adequate attachment of the conformal pad to the engagement surface. For example, a structural retention feature, such as an interlock feature, may be used in conjunction with the overmolding process to interlock the rigid and elastomeric components of the finger element at the engagement surface. FIG. 4I illustrates an interlocking silicone retention lattice in accordance with one or more embodiments. This non-limiting silicone retention lattice is formed by a series of pockets in the rigid material with their long edge transverse to the force application direction (pick direction) of the finger element. This provides an interlocking transfer of traction forces from the target object, to the elastomer, to the rigid finger element body. The transverse pockets are met with an axial pocket from the other side of the beam. This set of pockets forms an overlapped lattice, ensuring that the elastomeric material is mechanically interlocked to the rigid plastic body. FIG. 4J shows a cross-section of the related beam. FIG. 4K provides a cross-section of the interlock in detail. In accordance with one or more embodiments, the conformal pad may be characterized as a high surface area contact pad. For example, as illustrated in FIG. 4K, a conformal pad may include a thin frontal cross-section that expands to a spoon-style paddle composed of elastomer. The rigid body of the beam's engagement surface extends along the back of this paddle to provide rigidity during grasping, but also to provide a smooth sliding surface to avoid moving objects in the scene or environment that are not the intended grasp target. The internal contour of the conformal surface may allow for a very small deformation of the elastomer to provide even surface contact on the target object. In addition, the tip of the finger element's engagement surface may be 50% or more elastomer by composition, further reducing the potential point loading on the target object during grasp. The engagement surface and/or its contour pad may generally be textured in accordance with one or more embodiments.

As shown in FIGS. 5A-5D, an added flexible deformable member bridging the opening of the tong grippers can be used to more effectively select a grasping target from a cluttered environment. For example, as shown in FIGS. 5A and 5B a cord 529A, which may be flexible, is suspended between the engagement surfaces 520A of the tong gripper 500A, according to an embodiment. The cord 529A placed in this way can be used to self-center the gripping motion on the grasping target 590A as the tension on the cord 529A and length of the cord 529A varies when the cord comes into contact with the grasping target 590A, and as cam followers 560 actuate the tong gripper 500A. Cord 529A could also be used to hook or pull on or otherwise preposition a grasping target 590A in a crowded environment. This motion may be used to separate the target 590A from the larger bunch and assure singularity of the gripped target. As shown in FIGS. 5C and 5D a cord 529B in the form of a semi-rigid member may be used in the outward facing orientation to serve a similar function of locating the grasping target 590B to the tong grippers 500B before a complete actuation has occurred via cam followers 560. Although the cord 529B is shown mounted at the proximal end of the engagement surfaces 520B and the cord 529A is shown mounted at the distal end of the engagement surfaces 520A, it should be appreciated that these positions may be exchanged.

Figure 5E:
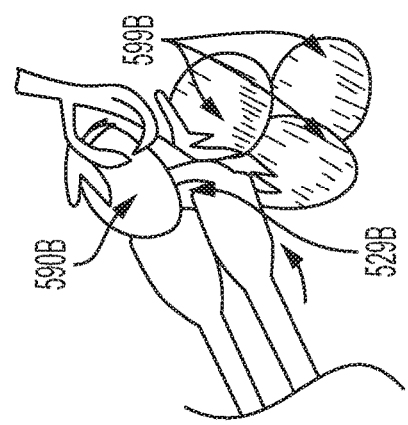
Figure 5F:
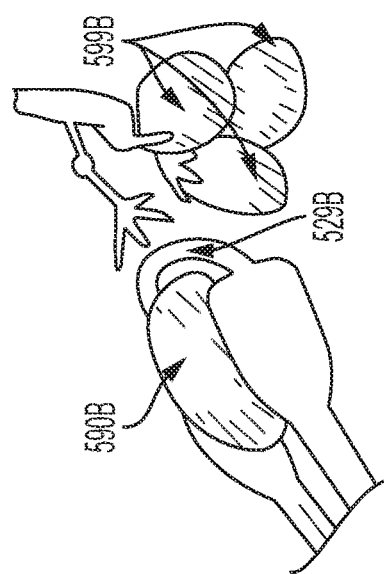
Figure 5G:
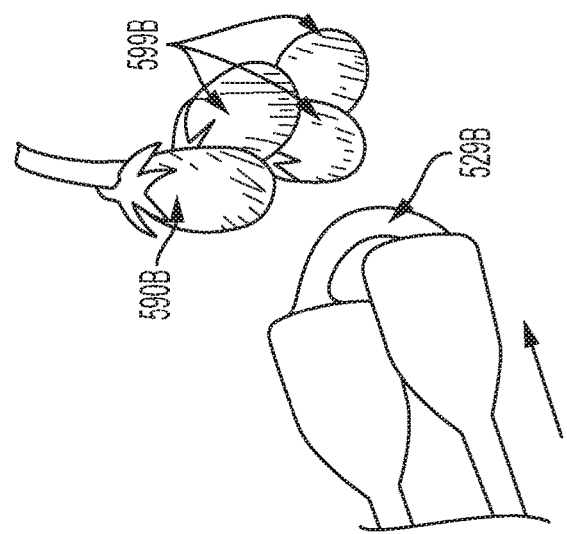
Figure 5H:
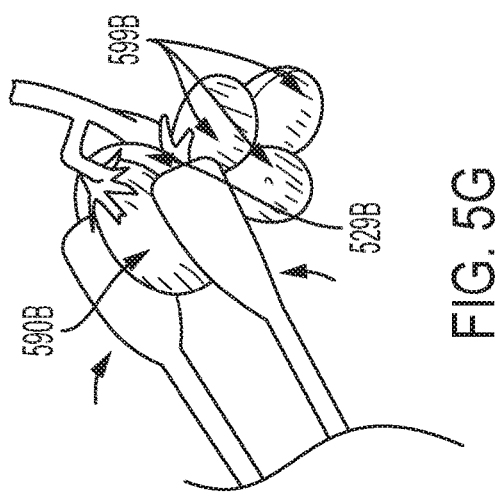

In addition, this outward facing cord 529B attached to engagement surfaces 520B can be used as a narrow cross section leading tool edge to separate a target from a bunch, or as an even pushing surface to manipulate obstructing items in the environment. For example, as shown in FIGS. 5E-5H, outward facing cord 529B is used to separate the grasping target 590B from other unintended objects such as objects 599B. As shown in FIG. 5E, as the tong grippers approach the grasping target 590B, the outward facing cord 529B is shown in the leading edge. As shown in FIG. 5F, the tong grippers first make contact with the grasping target using the outward facing cord 529B. The outward facing cord 529B may be used to move the grasping target 590B away from the objects 599B. As shown in FIG. 5G, the outward facing cord 529B may then partially surround the grasping target 590B, allowing the engagement surfaces to fall on either side of the grasping target 590B. As shown in FIG. 5G, the tong grippers are actuated, and the outward facing cord 529B assists in pulling the grasping target 590B away from the other objects 599B in the work environment.

Figure 6:
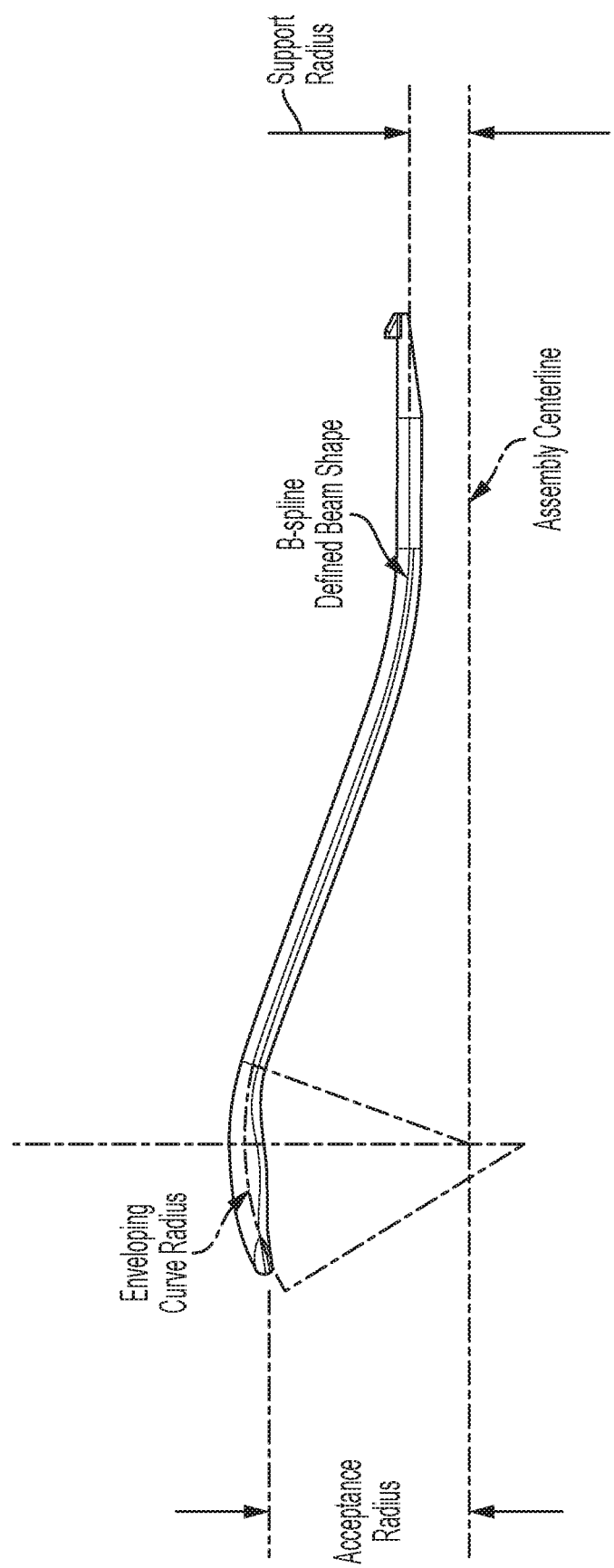
FIG. 6 presents details of a finger element beam having a Bézier spline curve contour profile in accordance with one or more embodiments.
Figure 6B:
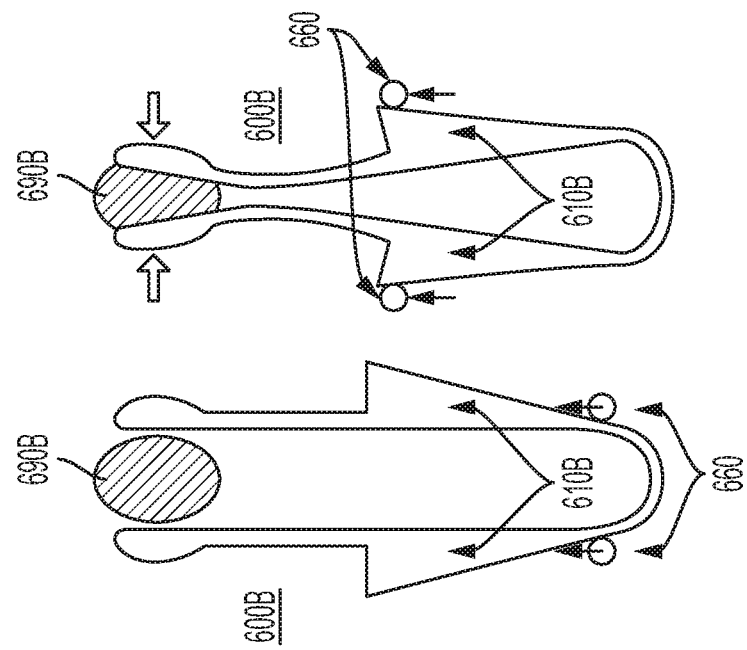
FIGS. 6A-6B show tong grippers with contour surfaces having varying thicknesses, according to some embodiments.
Figure 6A:
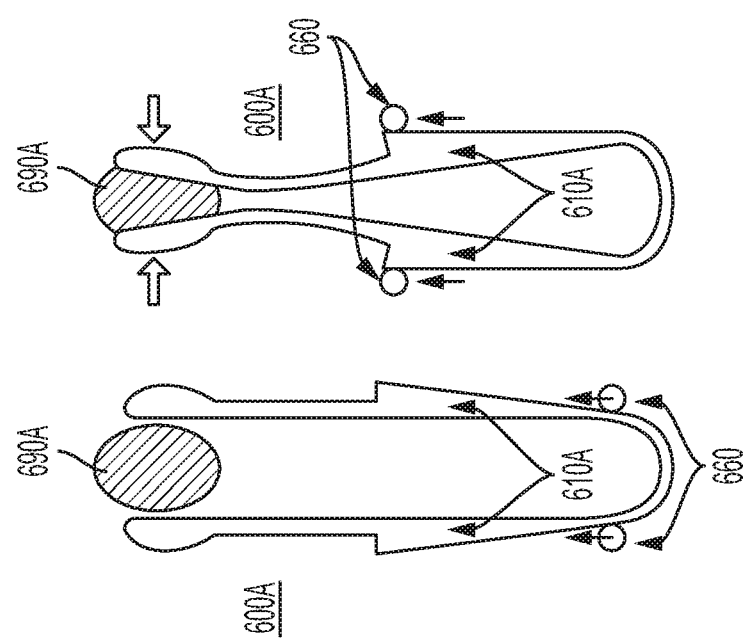
Figure 6C:
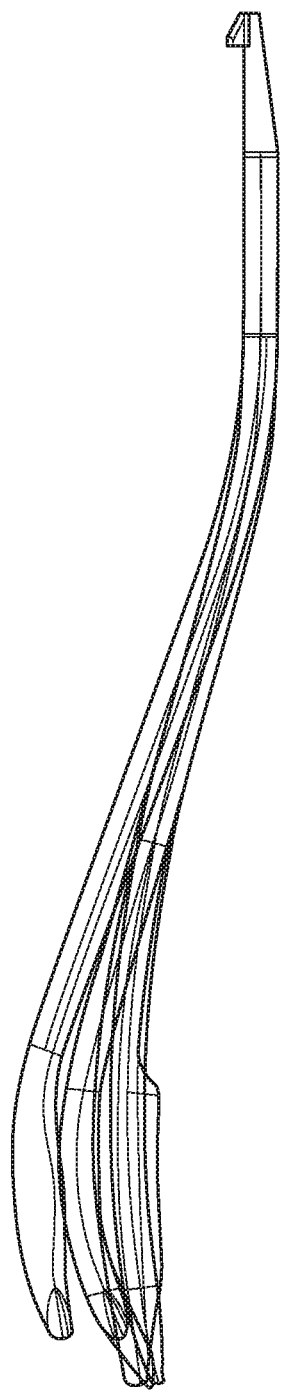
FIG. 6C presents on overlay schematic of curve contour profiles for gripper finger elements in accordance with one or more embodiments.
Figure 6D:
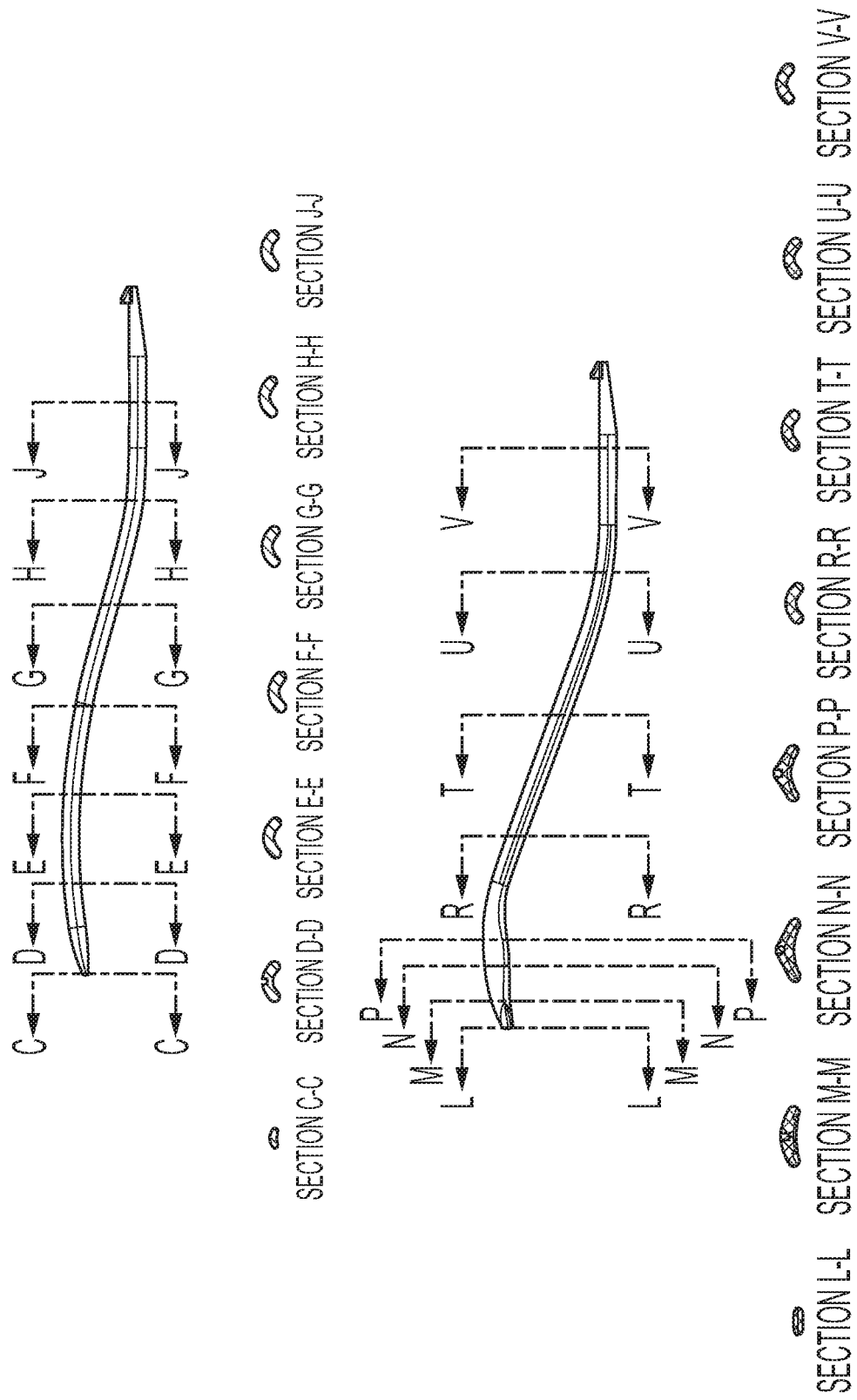
FIG. 6D presents cross-sectional details of a finger element in accordance with one or more embodiments.

In accordance with one or more embodiments, a contour profile or contour surface of the beams of the finger elements may be a significant design consideration in terms of defining a force profile and interaction applied to a target object. The contour profile may be optimized along with beam composition, cross-section, and/or thickness in this regard. The contour profile may generally interface with the actuator in terms of manipulating the finger elements to achieve grasping by the engagement surfaces and therefore a geometry of the contour profile may be customizable to achieve a desired force profile and/or interaction. In some non-limiting embodiments, a beam contour profile may be defined by a Bézier spline curve. A smooth connection may be made from a straight segment used to support the finger element at its base to a radius of curvature that envelops the grasping target at the engagement surface. The support segment of the finger element may be fixed at a certain support radius from an assembly centerline as shown in FIG. 6. FIGS. 6A and 6B shows two exemplary design profiles of contour surfaces for engagement with cam followers, according to some embodiments. As shown in FIGS. 6A and 6B the design of the contour surfaces can be used to determine the amount of travel and force applied at the distal end of the tong grippers. In combination with the beam design of the tong arms, the absolute force applied to the grasping target can be controlled completely in the design of the tong grippers themselves. FIG. 6A shows tong grippers 600A in open and closed positions. Tong grippers 600A have a small ramp-like shape along the contour surface 610A. This is designed to apply a small amount of force on the grasping target 690A as the cam followers 660 is advanced along the length of travel. As shown in FIG. 6B, tong grippers 600B are in open and closed positions. Tong grippers 600B are designed with a steeper ramp-like shapes along contour surface 610B, which pushes the tong grippers 600B closer together, and deflects the tong arm more, applying a greater grasping force to the grasping target 690B. With further reference to FIG. 6, the combination of the magnitude of the support and enveloping curve radius may determine the magnitude and shape of the curve in the b-spline, although additional spline control points and weights can further modify the shape to change the force application profile. By varying these parameters with respect to a target acceptance radius, various profiles may be achieved as shown in the overlay presented in FIG. 6C. FIG. 6D presents cross-section details pertaining to one non-limiting embodiment of a Bézier spline curve design. The enveloping curve and/or acceptance radius may vary with respect to different target objects in terms of facilitating approach, enveloping, grasping, detaching, and/or removing of the target object. In at least some embodiments, it may be desirable to provide an engagement surface characterized by an enveloping curve radius and/or acceptance radius that is oversized by about 1.25 to about 1.5 times a size of the target object. These contour surface profiles can be integral with the tong grippers or can be included as their own separate interchangeable unit, enabling changes of force application without changing the grip surface itself.

Figure 7C:
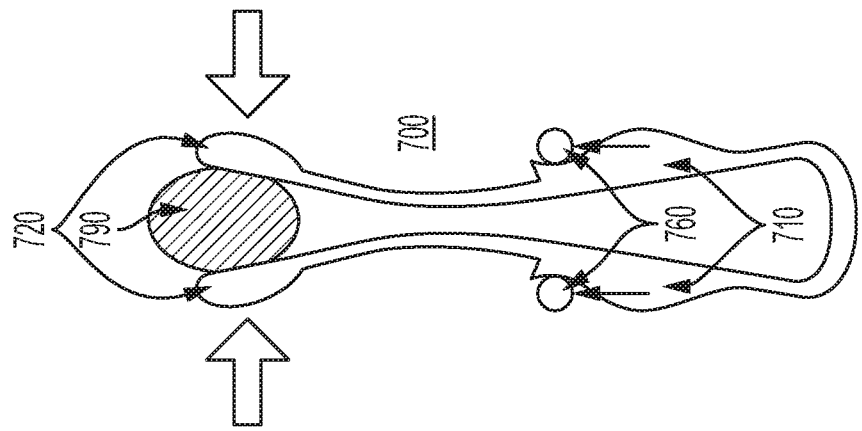
FIGS. 7A-7C show tong grippers with non-linear contour surfaces for varied motion and force profiles, according to some embodiments.
Figure 7B:
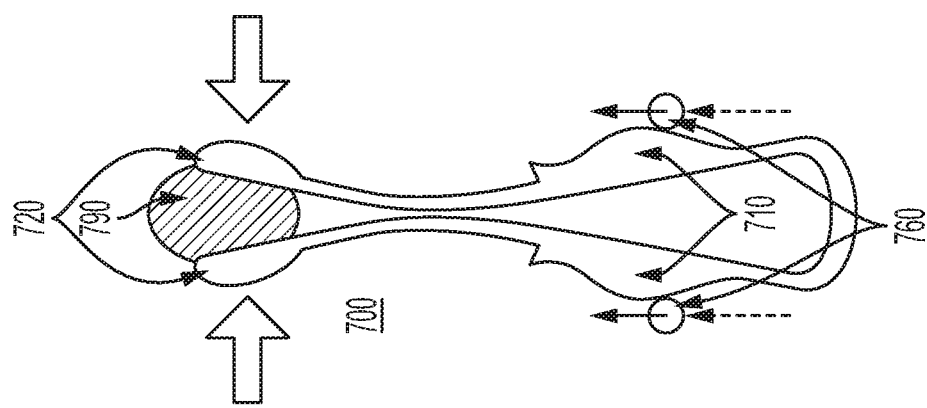
Figure 7A:
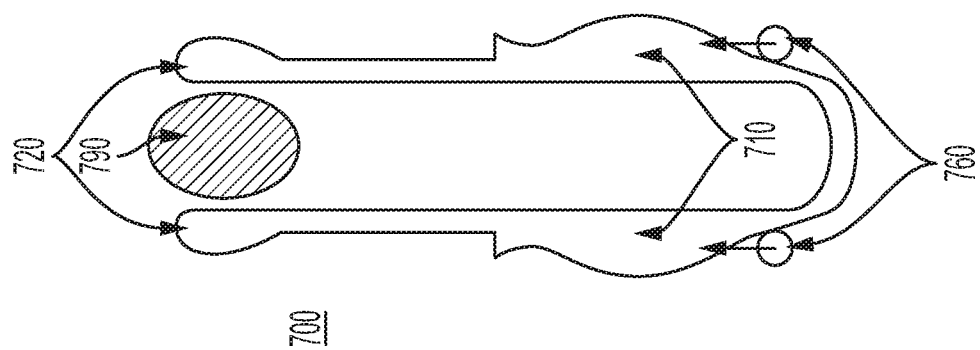

Referring to FIGS. 7A-7C, the contour surfaces 710 can be made in more complicated shapes (not straight) in order to alter the sequence of force delivery closure distances the tong grippers move through as the drive mechanism advances cam followers 760 up the length of the tong arms. For example, as shown in FIG. 7A, the cam followers 760 are at the base of the tong at a point in the contour surface 710 where the drive mechanism is not applying a compressive force. As a result, the engagement surfaces 720 of the tong gripper 700 are in their rest state. Next, as shown in FIG. 7B, the cam followers 760 have advanced approximately half way up the profile of the contour surfaces to a point along the profile that has a wide cross section. In this position, the drive mechanism is substantially compressing the tong grippers 700 inward and as a result at the engagement surfaces 720 are closed and applying a substantial force on to their grasping target 790. Finally, as shown in FIG. 7C, the cam followers 760 have advanced up the profile of the contour surfaces 710 to a point along the profile where it has an intermediate cross section. As a result, the engagement surfaces 720 of the tong grippers 700 will apply an intermediate force on the grasping target 790 and the engagement surfaces 720 of the tongs are at an intermediate level of closure. Choices in the design of the nonlinear profile for contour surfaces allow the designer to embed desired automatic behaviors into the mechanical assembly. For example, a profile such as the one shown in FIG. 7C would apply the largest force for a short time during the picking of the target item and relax to a sufficient force for transportation after the picking action has taken place. Another desired behavior would be to begin in a closed state, advance to an open state, and close again at the full stroke length, bounding the grasping cycle and constraining the motion timing for opening as well as closing while still being driven by a single low cost linear motion element.

Figure 8A:
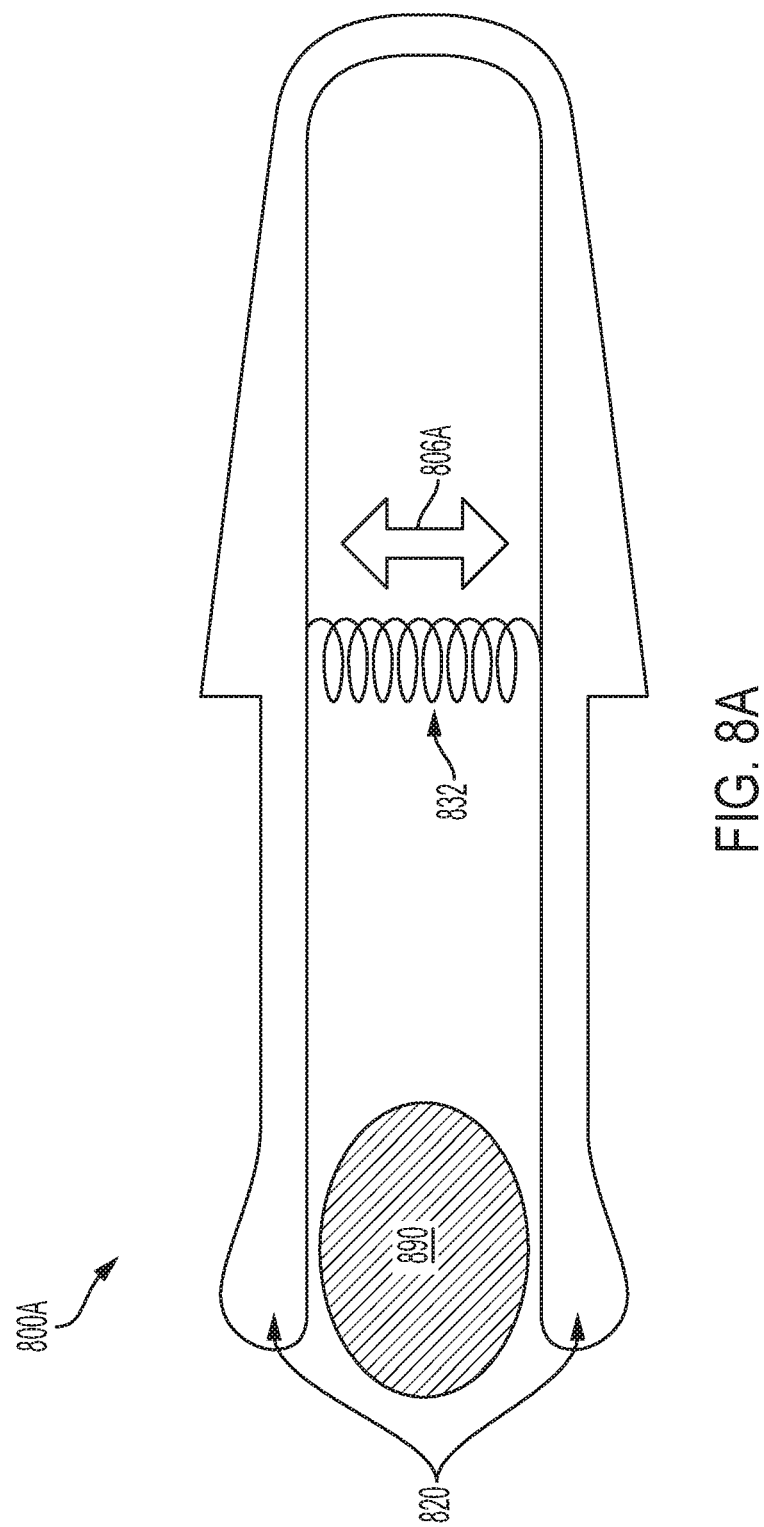
FIGS. 8A-8C show additional elements on tong grippers, according to some embodiments.
Figure 8B:
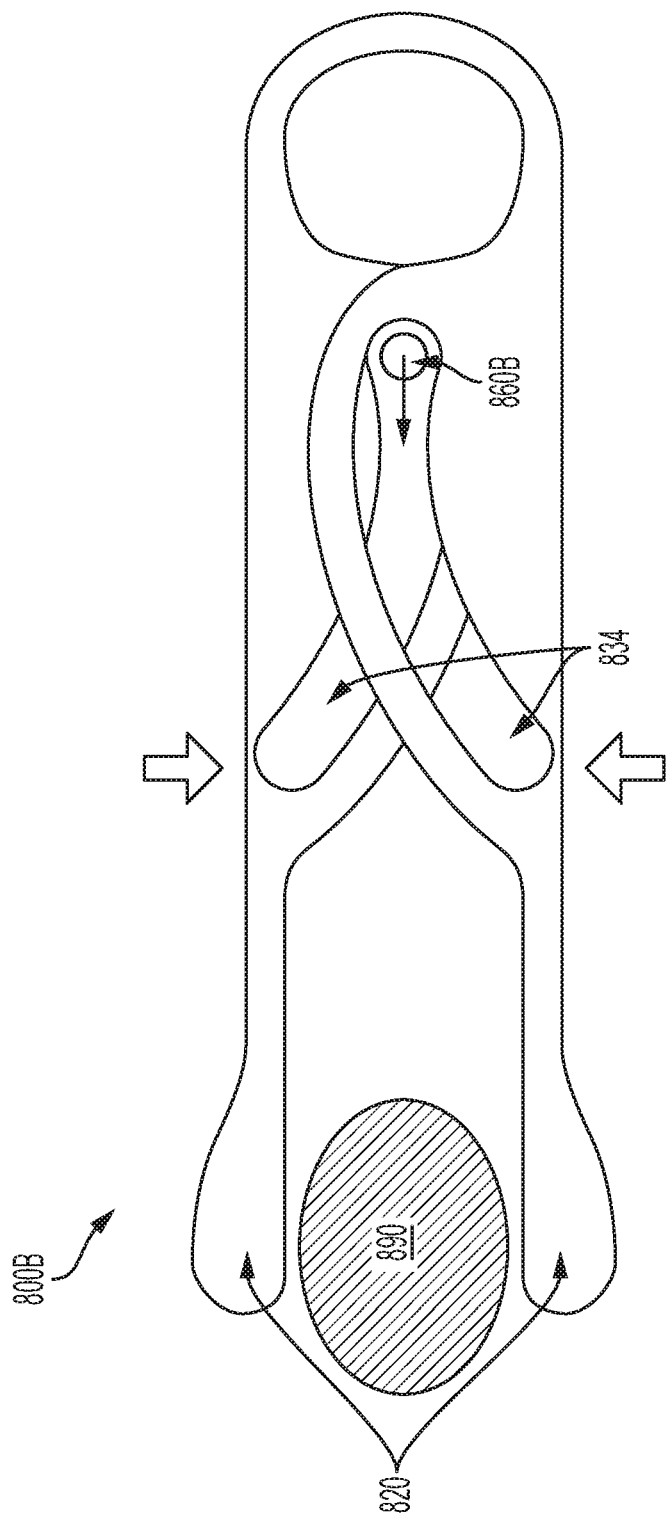
Figure 8C:
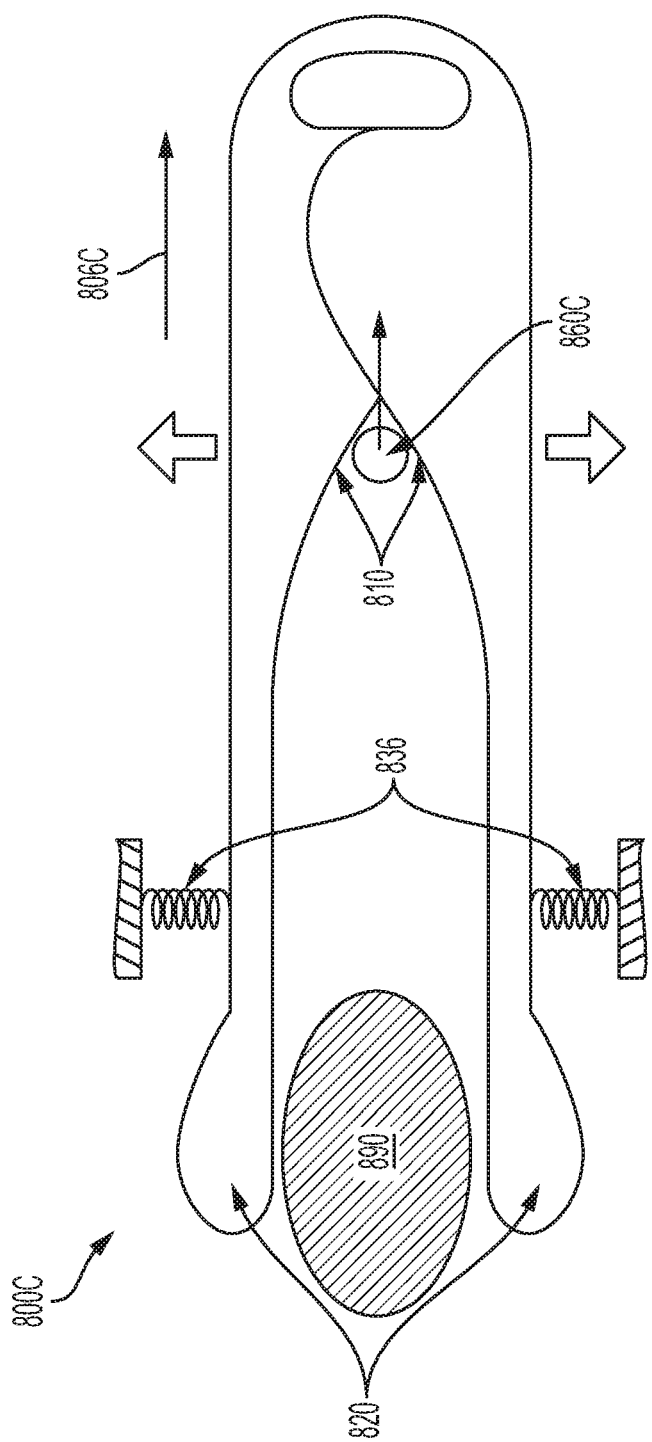

FIGS. 8A-8C show additional mechanistic elements can be employed to achieve closure and force behavior desired to grasp a given grasping target, according to some embodiments. As shown in FIG. 8A, a helical spring element 832 may be used to force the engagement surfaces 820 to return to an open position when pressure from the cam followers is relieved. This spring 832 could be comprised of many types of springs such as but not limited to leaf and torsion springs, as discussed above with reference to FIGS. 3G-3L. Spring 832 may be integral to the design of the tong gripper itself.

FIG. 8B, shows a centered cam follower 860B that rides on the inside of the tong gripper 800B, which has cam paths 834 included in arms. Cam paths 834 both interact with the singular centered cam follower 860B to form a bounded track. This configuration produces the effect of having positive drive engagement in both directions of travel that is tied to the fit of the cam follower 860B within the cam paths 834, which can be desirable when navigating through obstructions to pick a target fruit on a vine or branch. For instance, the tong grippers may be closed to insert the tips past environmental obstructions such unripe fruit, vines, foliage, or infrastructure to place the tips near the grasping target, such as fruit before opening the grippers to engage the grasping target. The cam arrangement in FIG. 8B ensures that the grippers cannot be forced closed by any interaction with the environment while engaging the target. Beneficially, cam arms are restricted from motion in inward and outward directions by the placement of the cam follower 860B within cam paths 834.

FIG. 8C shows an arrangement of tong gripper 800C. Tong gripper 800C functions by using a cam follower 860C that spreads the engagement surfaces 820 apart as it moves in direction 806C along internal contoured surfaces 810. As the cam follower 860C moves opposite to direction 806C, spring elements 836 force the engagement surfaces 820 into a closed position. In this sense the tong gripper is normally closed when the cam follower 860C is not applying pressure to the contoured surfaces 810. Although FIG. 8C shows spring elements 836 as two separate elements on the external surface of the tong gripper 800C, it should be appreciated that according to an embodiment, spring elements 836 may be exchanged with an internal spring element that exerts a pulling force on the arms of the tong gripper 800C. Such a spring element 836 may be a coil spring in a stretched state, an elastic band in a stretched state, or another similar element.

Figure 9C:
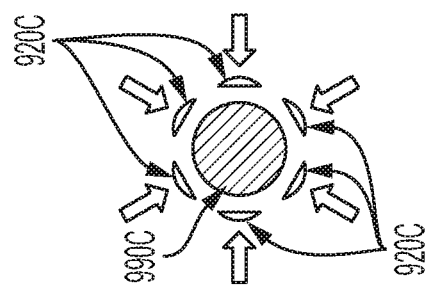
FIGS. 9A-9C show grasping apparatuses with varying numbers of engagement surfaces, according to some embodiments.
Figure 9B:
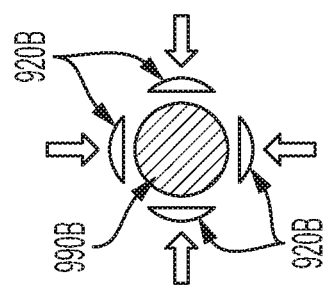
Figure 9A:
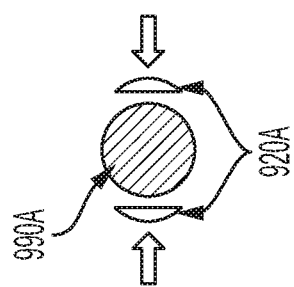

FIG. 9 shows tong grippers with varied numbers of engagement surfaces, according to some embodiments. As shown in FIG. 9A, at a minimum, a tong gripper may be constructed with two engagement surfaces 920A for grasping the gasping target 990A. However, an arbitrary number of engagement surfaces may be employed to enhance grip and grip structure on the grasping target. In some non-limiting embodiments, a harvesting tool may include a gripper having two or more finger elements, i.e., two, three, four, five, six, or more finger elements. In at least some non-limiting embodiments, a harvesting tool with three finger elements may be preferred. As shown in FIG. 9B, tong arms are arranged in two planes perpendicular to one another and four engagement surfaces 920B grip the grasping target 990B from the left, right, top and bottom. As shown in FIG. 9C, a six-arm set of tong arms is arranged in three planes to grip the grasping target 990C with six engagement surfaces 920C from six opposed directions. Other arrangements with different numbers of grasping arms, including asymmetric grasping arm arrangements can be used to achieve an even radial pressure on a delicate grasping target. Further, different cam profiles can be employed on each grasping arm, allowing for varied timing or pressure of force application all driven by a single actuator. In still other embodiments, different tongs can be driven by different and independent drive mechanisms. In embodiments where more than two engagement surfaces are employed, the cam follower driving mechanism can be modified to drive more than two tong arms. This can be accomplished by extending the arrangement presented in FIG. 1 to incorporate a cam follower which is perpendicular to each contoured surface but still commonly connected to a shuttle driven back and forth by a form of linear actuation. Whether driven by one or multiple linear actuators, each tong arm may be associated with a substantially perpendicular cam follower to react against and produce a grasping force. As the number of radial arms increases, the contact area of the outer cam reaction surfaces begins to approximate that of a cylinder or cone. According to some embodiments, a large number of tong arms could be actuated by a single conical tapered surface (similar to the collet seat found in the spindle of a milling machine or lathe) rather than employing many individual cam followers. A collet driven device could also provide the advantage of not constraining the tong arm assembly to any specific number of engagement surfaces. Instead, many different tong arm arrangements could be driven by the same mechanism and automatically centered by interaction with the collet.

In accordance with one or more embodiments, a harvesting tool may be removably receivable by a robotic arm. The robotic arm may be attached to a robotic carriage or a robotic manipulator as part of a robotic harvesting system. In some embodiments, two or more harvesting tools may be removably receivable by a single robotic arm. In other embodiments, each robotic arm of a robotic harvesting system may have a dedicated harvesting tool. In still other embodiments, two or more robotic arms of a robotic harvesting system may each have two or more dedicated harvesting tools. In some embodiments, a robotic harvesting system may include at least one sensor associated with a harvesting tool, robotic arm, and/or other component. In at least one embodiment, a robotic harvesting system can include two or more robotic carriages or manipulators.

Figure 10:
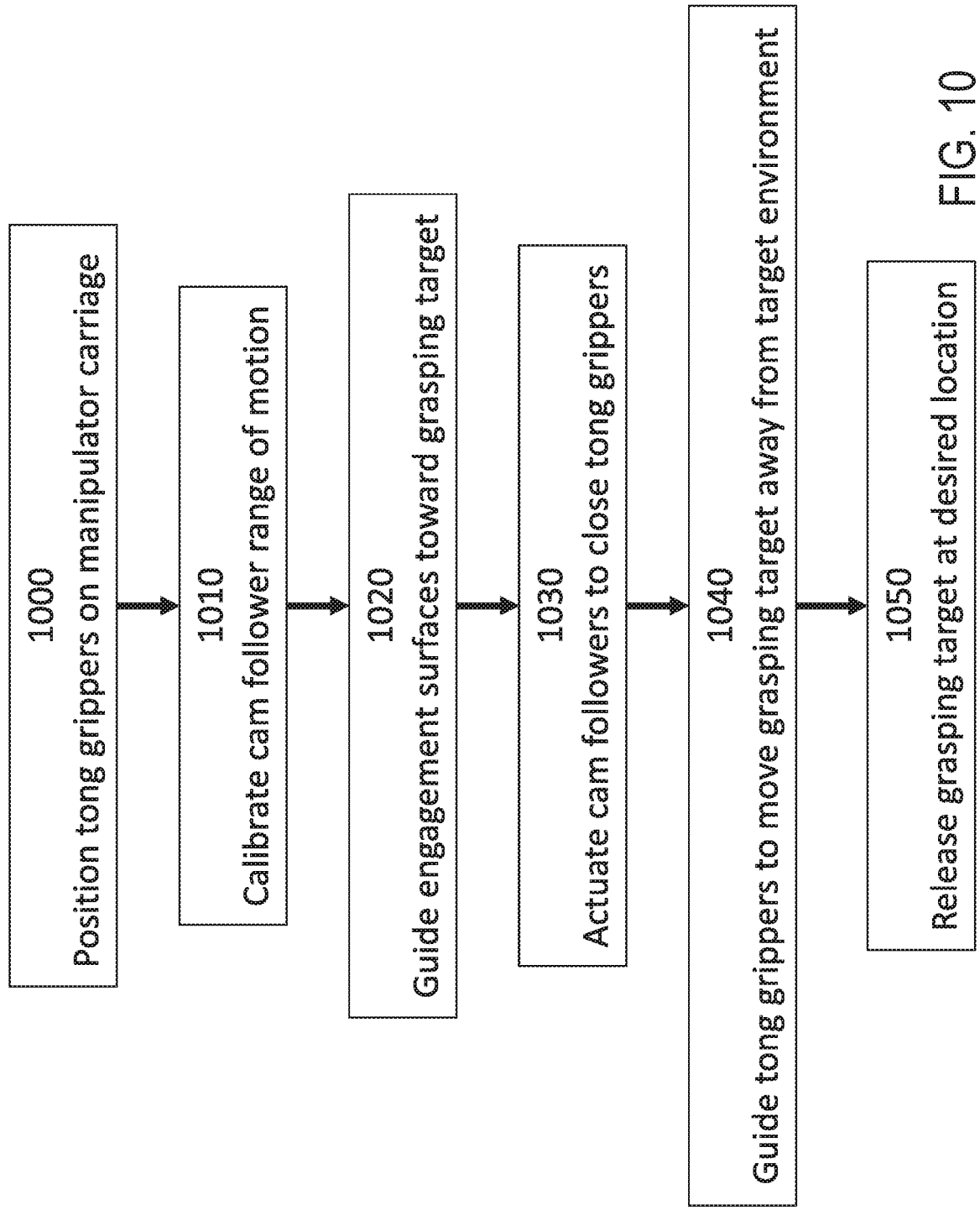
FIG. 10 shows an exemplary method of operation of various embodiments of the tong grippers disclosed herein, according to some embodiments.

According to some embodiments, the operation of the various tong grippers disclosed herein may be controlled via a control system. A robotic platform may be used to actuate the gripper, i.e., via actuation of a pneumatic drive. An internal microprocessor may, for example, manage other functions. The control system may be connected to various sensors disposed on or near the tong grippers. According to some embodiments, the tong grippers discussed throughout the present disclosure do not have any force, motion, position, velocity, pressure, contact, and/or other sensors. According to some embodiments, the mechanisms for actuating the tong grippers may be controlled by the control system. Such a control system may be automatic, controlled by human input, or a combination thereof. For example, FIG. 10 shows an exemplary method of operation of various embodiments of the tong grippers discussed with reference to FIGS. 1-9 in order to pick a fruit or vegetable in a target environment. As shown in FIG. 10, the method of operation begins by positioning the tong grippers on a manipulator carriage at step 1000. At step 1010, the actuator mechanism is optionally calibrated to a range of motion of the tong grippers. At step 1020 the tong grippers are guided to a grasping target in a target environment. This may involve positioning the tong grippers on either side, or multiple sides of the target. Once proper actuation position is confirmed, the cam followers are actuated at step 1030. Once the actuation is complete, proper grasping of the grasping target may be confirmed. Next, at step 1040 the tong grippers may be guided to move the grasping target away from target environment. Finally, at step 1050 the tong grippers release the grasping target at a desired location. The process can then be repeated starting at step 1020 for subsequent grasping targets.

Proper grasping of the grasping target may, in some embodiments, be explicitly confirmed by feedback from sensors incorporated into the manipulator carriage or incorporated directly into the tong grippers themselves. For example, confirmation of picking may be provided via feedback from a machine vision subsystem. Sensing elements may include but are not limited to, force sensing resistors, load cells, optoelectrical proximity or reflectance sensors, pressure sensors embedded in bladders or compressible or incompressible fluids, or mechanical limits switches employed to either detect the presence of a grasped object, the magnitude of the force applied to that object, or both. Feedback from these sensors may also be employed to coordinate the motion of the tong grippers with other external systems, such as a multi-degree-of-freedom robotic manipulator or process automation system. Such coordination allows external systems to intelligently rectify a failed grasp by making subsequent attempts, or resolve a low quality grasp by automatically adjusting the speed of movement.

The subject matter described herein, including the control system, can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

In accordance with one or more embodiments, a robotic manipulator may allow for customized motion, travel, and/or force profiles during actuation of a related robotic arm and/or harvesting tool. In at least some embodiments, a robotic manipulator may be calibrated.

In accordance with one or more embodiments, the robotic harvesting system may include a processor programmable to visualize an environment and/or a target object. The processor may be programmable to discern one or more properties of a target object, i.e. its relative positioning and/or its dimensions. The processor may be programmable to identify and/or locate a target object within an environment. The processor may be programmable to estimate ripeness of a target object.

In accordance with one or more embodiments, a robotic harvesting system may include a controller programmable to operate a robotic arm. The controller may be further programmable to operate the harvesting tool. The controller may be associated with the robotic carriage or manipulator. The controller may receive input from the processor and provide one or more control signals to the robotic arm and/or harvesting tool.

In some embodiments, the controller may be programmable to actuate the robotic arm in order to strategically position the harvesting tool within an environment. In this way, the gripper and/or its plurality of finger elements may be placed in proximity of a target object to facilitate harvesting thereof. The controller may manipulate the robotic arm such that the plurality of finger elements of the gripper envelops a target object, either partially or completely. The controller may be programmable to actuate the actuator, i.e. manipulator carriage, of the harvesting tool to achieve grasping of the target object by the plurality of finger elements. The controller may be programmable to achieve a predetermined degree of closing of the plurality of finger elements. The predetermined degree of closing may correlate to at least one parameter of the target object, for example, a size or a geometry of the target object. As with enveloping, varying degrees of grasping of a target object are achievable. Once the target object is grasped, the controller may be programmable to dislodge the target object in place. The controller may be programmable to remove or relocate a grasped target object, either environmentally free or expressly dislodged. The controller may be further programmable to release and/or otherwise deliver a target object to a desired location, such as for storage or downstream processing. In accordance with one or more embodiments, the controller may be programmable to operate various components of the robotic harvesting system at variable speeds.

In accordance with one or more embodiments, a robotic harvesting system may be programmed to operate a robotic arm and/or harvesting tool according to customizable routines. For example, in some non-limiting embodiments a system may sequentially envelop, grasp, detach, and remove a target object from an environment.

In accordance with one or more embodiments, a method of harvesting a target object may generally involve enveloping the target object, such as with a plurality of finger elements. The target object may then be grasped with the plurality of finger elements. A grasped target object may be dislodged in place. The grasped target object may then be removed and/or released from the environment. For example, the target object may be released and/or delivered to a downstream process. The target objected may be enveloped, grasped, dislodged, and removed in series in some non-limiting embodiments. Environmental obstructions, i.e. other target objects, vines, and/or leaves, may be substantially avoided during the harvesting operation.

In some embodiments, a target object may be identified, located, and/or characterized. At least one characteristic of the plurality of finger elements may be selected based on at least one parameter associated with the target object and/or related environment. Ripeness of the target object may be assessed. A force level that is less than a threshold level may be exerted on the target object.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A harvesting tool, comprising:
    a gripper comprising a plurality of finger elements constructed and arranged to envelop a target object pertaining to agricultural produce, each finger element having a nonlinear contour surface profile configured to provide a first force during picking of the target object and a second force that is less than the first force for transportation of the target object subsequent to picking; and a manipulator carriage configured to actuate the gripper during operation to grasp the target object.

2. The tool of claim 1, wherein the gripper is interchangeable with respect to the manipulator carriage.

3. The tool of claim 1, wherein the manipulator carriage is configured to linearly actuate the gripper during operation.

4. The tool of claim 3, wherein the manipulator carriage comprises:
    a lead screw;
    a shuttle; and
    a pair of cam followers whereby, in operation, rotation of the lead screw causes the shuttle to travel linearly along an axis of the lead screw which, in turn, causes the pair of cam followers to move along a length of the plurality of finger elements to actuate the gripper.

5. The tool of claim 4, wherein the pair of cam followers comprises wheeled rollers.

6. The tool of claim 1, wherein the manipulator carriage is constructed and arranged to avoid operational interference due to environmental interaction.

7. The tool of claim 1, wherein the manipulator carriage is characterized by at least one operational parameter which correlates to a desired force to be applied to the target object.

8. The tool of claim 1, wherein the harvesting tool is configured to exert a level of force on the target object that is below a threshold level.

9. The tool of claim 1, wherein the plurality of finger elements is configured to accommodate a requirement associated with the target object.

10. The tool of claim 1, wherein the plurality of finger elements is configured to accommodate a requirement associated with an agricultural environment.

11. The tool of claim 1, wherein each of the plurality of finger elements is characterized by at least one of a beam stiffness, impedance, and/or torsional resistance value which correlates to a desired force to be applied to the target object.

12. The tool of claim 1, wherein each finger element comprises a beam, and an attachment portion at a proximate end of the beam relative to the manipulator carriage.

13. The tool of claim 1, wherein each finger element has a beam cross-section profile designed to minimize material usage while enabling a desired force to be applied to the target object.

14. The tool of claim 1, wherein the plurality of finger elements are jointed.

15. The tool of claim 1, wherein the plurality of finger elements are contoured to facilitate grasping of the target object.

16. The tool of claim 1, wherein each finger element comprises an engagement surface at a distal end relative to the manipulator carriage to facilitate grasping of the target object.

17. The tool of claim 16, wherein each finger element comprises a conformable feature at the engagement surface to facilitate grasping of the target object.

18. The tool of claim 16, wherein the engagement surface is characterized by an enveloping curve radius oversized by about 1.25 to about 1.5 times a size of the target object.

19. The tool of claim 16, wherein the engagement surface is defined by a surface area apt to enter a cluttered environment.

20. The tool of claim 16, wherein the engagement surface is defined by a surface area apt to singulate a target object while avoiding damage of the target object.

21. The tool of claim 16, wherein the engagement surface has a frontal profile defined by a pointed cross-section.

22. The tool of claim 21, wherein the frontal profile transitions to a paddle shape along a length of the engagement surface.

23. The tool of claim 16, wherein the engagement surface comprises a conformal pad configured for load spreading and to increase grasp adhesion with respect to the target object.

24. The tool of claim 23, wherein the conformal pad has a high surface area relative to the overall engagement surface.

25. The tool of claim 23, wherein the conformal pad is overmolded on the engagement surface.

26. The tool of claim 23, wherein the conformal pad comprises an elastomeric material.

27. The tool of claim 26, wherein a beam of the finger element comprises a thermoplastic material.

28. The tool of claim 23, wherein the engagement surface is constructed and arranged such that a small deformation of the conformal pad provides substantially even surface contact on a grasped target object.

29. The tool of claim 23, wherein the conformal pad is textured.

30. The tool of claim 23, wherein the conformal pad is received by the engagement surface at a distal end of the finger element.

31. The tool of claim 16, wherein the engagement surface has a thin profile and/or cross-section to facilitate maneuverability within an agricultural environment.

32. The tool of claim 16, wherein the engagement surface comprises an outer profile and an elastic membrane inner profile configured to deform around the target object.

33. The tool of claim 32, wherein the outer profile of the engagement surface defines a gap.

34. The tool of claim 16, wherein the engagement surface comprises a fork-like structure.

35. The tool of claim 34, wherein tines of the fork-like structure are characterized by varying beam stiffness or shape.

36. The tool of claim 1, wherein each finger element is defined by a contour including an angled contour surface protrusion.

37. The tool of claim 1, wherein each finger element is characterized by a pre-curvature.

38. The tool of claim 1, wherein the nonlinear contour surface profile has a ramp-like shape.

39. The tool of claim 1, wherein the nonlinear contour surface profile is characterized by a Bezier spline curve.

40. The tool of claim 1, wherein the nonlinear contour surface profile is integral to the finger element.

41. The tool of claim 1, wherein a finger element beam design and contour surface profile cooperate to substantially control an absolute force applied to the target object.

42. The tool of claim 1, further comprising at least one sensor.

43. The tool of claim 42, wherein the sensor pertains to force, motion, position, velocity, pressure, contact, or other operational parameter.

44. The tool of claim 1, wherein the harvesting tool comprises a deformable member bridging the plurality of finger elements.

45. The tool of claim 1, wherein the manipulator carriage is configured to achieve closure and/or a desired force behavior with respect to the plurality of finger elements.

46. The tool of claim 1, further comprising a biasing element.

47. The tool of claim 1, wherein each finger element includes one or more reinforcing members along at least a portion of its length.

48. The tool of claim 1, wherein the harvesting tool is removably receivable by a robotic arm.

49. The tool of claim 1, wherein the target object is located in an agricultural environment.

50. The tool of claim 49, wherein the target object is a tomato, pepper, or cucumber.

51. The tool of claim 50, wherein the harvesting tool is configured to remove the target object from a vine.

52. The tool of claim 1, wherein the harvesting tool is configured to grasp the target object while substantially avoiding obstructions.

53. A harvesting system, comprising:
a robotic arm; and
the harvesting tool of claim 1 operatively attached to the robotic arm.

54. The system of claim 53, wherein the robotic arm comprises a multi-degree-of-freedom robotic manipulator.

55. The system of claim 53, further comprising a controller programmable to operate the robotic arm and/or the harvesting tool.

56. The system of claim 55, wherein the controller is programmable to position the plurality of finger elements in proximity of the target object to facilitate harvesting thereof.

57. The system of claim 55, wherein the controller is programmable to actuate the manipulator carriage to achieve a predetermined degree of closing of the plurality of finger elements.

58. The system of claim 57, wherein the predetermined degree of closing correlates to at least one parameter of the target object.

59. The system of claim 58, wherein the predetermined degree of closing correlates to a size or a geometry of the target object.

60. The system of claim 55, wherein the controller is programmable to actuate the manipulator carriage at a variable speed.

61. The system of claim 55, wherein the controller is configured to detach a grasped target object from a vine.

62. The system of claim 55, wherein the controller is configured to release the target object.

63. The system of claim 55, wherein the controller is configured to place the target object at a desired location.

64. The system of claim 55, wherein the controller is configured to deliver the target object to a downstream process.

65. The system of claim 55, wherein the controller is configured to manipulate the harvesting tool to sequentially envelop, grasp, detach, and remove the target object from an environment.

66. The system of claim 55, wherein the controller is configured to be calibrated.

67. The system of claim 53, further comprising a processor programmable to identify, locate, and/or position a target object.

68. The system of claim 67, wherein the processor is programmable to visualize an environment or a target object.

69. A method of harvesting a target object, comprising: enveloping the target object with a set of finger elements associated with the harvesting tool of claim 1; grasping the target object with the set of finger elements; dislodging the grasped target object; and removing the target object from a surrounding environment.

70. The method of claim 69, further comprising identifying and/or locating the target object.

71. The method of claim 69, further comprising selecting at least one characteristic of the plurality of finger elements based on at least one parameter associated with the target object and/or related environment.

72. The method of claim 69, wherein environmental obstructions are substantially avoided.

73. The method of claim 69, further comprising releasing and/or delivering the target object to a downstream process.

74. The method of claim 69, wherein the target object is enveloped, grasped, dislodged, and removed in series.

75. The method of claim 69, wherein a force level that is less than a threshold level is exerted on the target object during harvesting.

\* \* \* \* \*